(12) United States Patent
Iwaki et al.

(10) Patent No.: US 6,321,598 B1
(45) Date of Patent: Nov. 27, 2001

(54) ANGULAR VELOCITY SENSOR DEVICE HAVING OSCILLATORS

(75) Inventors: Takao Iwaki, Chiryu; Nobuyuki Ohya; Hiroaki Ito, both of Kariya, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/522,076

(22) Filed: Mar. 9, 2000

(30) Foreign Application Priority Data

Mar. 12, 1999 (JP) .................................................. 11-066947
Dec. 3, 1999 (JP) .................................................. 11-345134

(51) Int. Cl.[7] .................................................. G01C 19/00
(52) U.S. Cl. ..................................... 73/504.02; 73/504.12
(58) Field of Search ........................... 73/504.02, 504.03, 73/504.04, 504.12

(56) References Cited

U.S. PATENT DOCUMENTS

| 5,313,835 | 5/1994 | Dunn . |
| 5,329,815 | 7/1994 | Dunn et al. . |
| 5,359,893 | 11/1994 | Dunn . |
| 5,377,544 | 1/1995 | Dunn . |
| 5,511,419 | 4/1996 | Dunn . |
| 5,604,312 | 2/1997 | Lutz . |
| 5,734,105 | 3/1998 | Mizukoshi . |
| 6,070,463 | * 6/2000 | Moriya et al. .................... 73/504.12 |

FOREIGN PATENT DOCUMENTS

| 6-34375 | 2/1994 | (JP) . |
| 8-114456 | 5/1996 | (JP) . |
| 96/39615 | 12/1996 | (WO) . |
| 97/02467 | 1/1997 | (WO) . |

OTHER PUBLICATIONS

U.S. application No. 09/458,954, Higuchi et al., filed Dec. 10, 1999.

* cited by examiner

*Primary Examiner*—Richard A. Moller
(74) *Attorney, Agent, or Firm*—Law Office of David G. Posz

(57) ABSTRACT

An angular velocity sensor device includes drive oscillators oscillated by driving in drive direction a0, and detecting oscillators connected to the drive oscillators and oscillated in detecting directions a1, a2 by a Coriolis force, which is generated by an angular velocity in a direction K. The directions a1, a2 respectively make an angle θ with the direction K. Detection electrodes are provided for the detecting oscillators, and produce output signals. A signal caused by an inertia force and a signal caused by the Coriolis force are obtained from the output signals, and the angular velocity is determined by the two signals.

34 Claims, 22 Drawing Sheets

FIG. 8
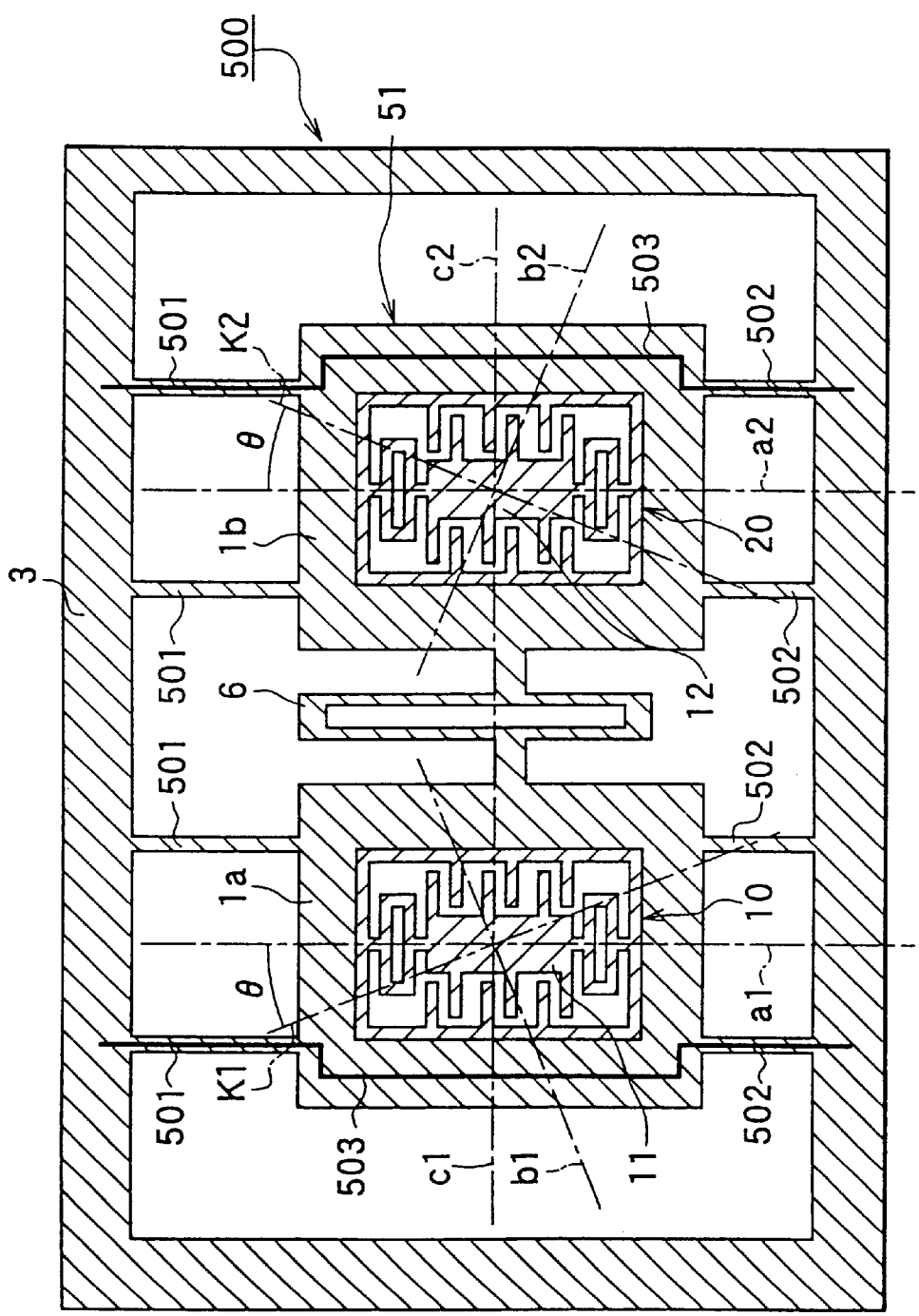
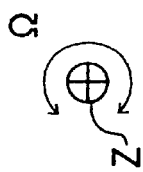

FIG. 17
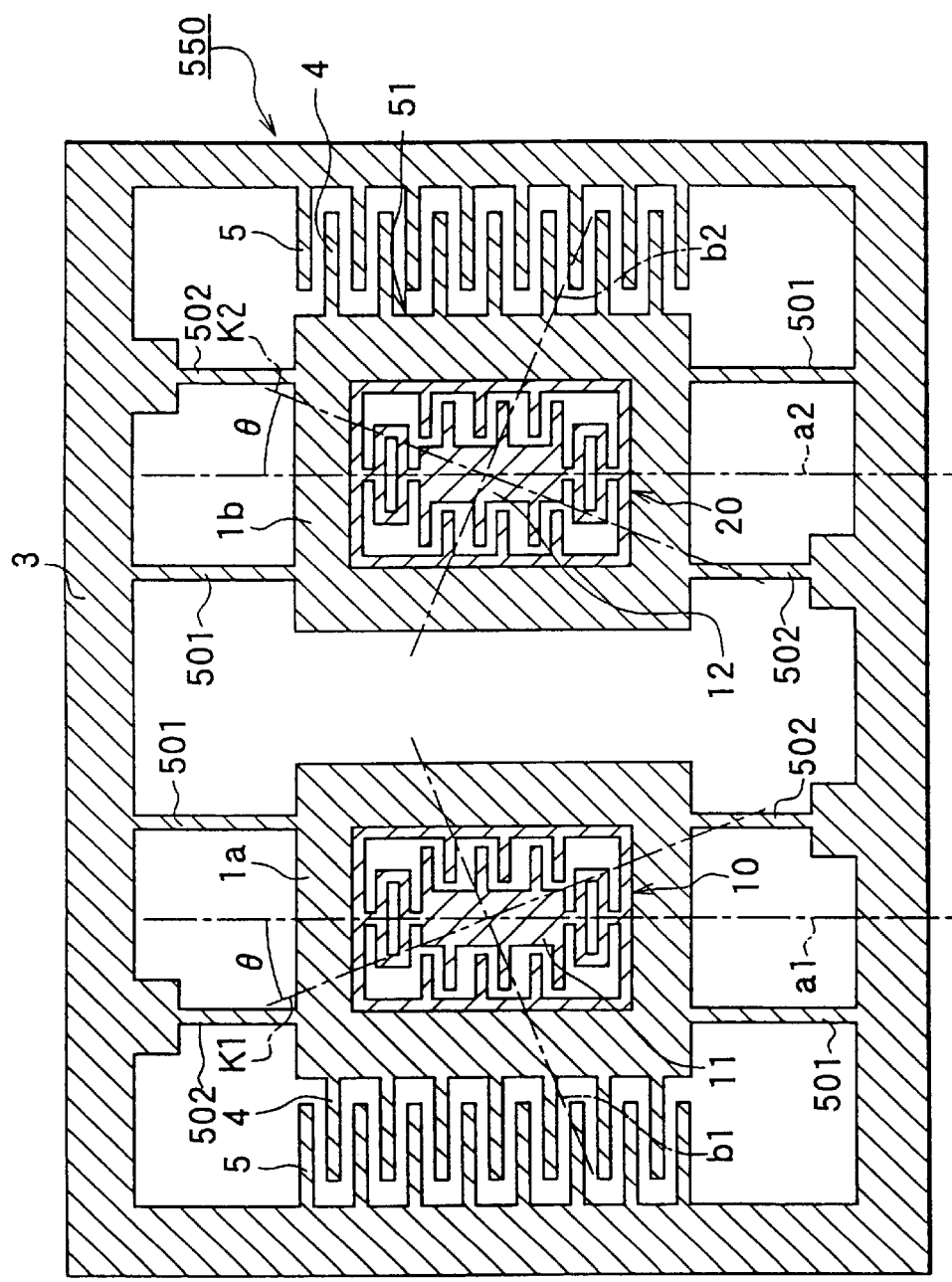
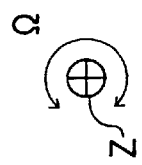

ANGULAR VELOCITY SENSOR DEVICE HAVING OSCILLATORS

CROSS REFERENCE TO RELATED APPLICATIONS

This application is based upon and claims the benefit of Japanese Patent Applications No. 11-66947 filed on Mar. 12, 1999, and No. 11-345134 filed on Dec. 3, 1999, the contents of which are incorporated herein by reference.

BACKGROUND OF THE INVENTION

1. Field of the Invention

This invention relates to angular velocity sensor devices such as an automotive control system, an automotive tipping detection system, a navigation system, and a hand-blurring preventing system for an optical instrument, which detect angular velocities.

2. Description of the Related Art

There is proposed an oscillation type angular velocity sensor device, which is produced by a micro-machine technique for purposes of size reduction and low cost. Such sensor device typically has a sensor element shown in FIG. 23. The sensor element has a sensor chip produced using an SOI substrate to have a frame portion J1. An oscillator J4 is supported by driving beams J2 and detection beams J3 to hang across the frame portion J1. An arrow a0 indicates a drive oscillation direction of the oscillator J4 and an arrow a1 indicates a detecting oscillation direction of the oscillator J4, i.e., a direction in which a Coriolis force is produced.

The oscillator J4 having a mass m is oscillated in the drive oscillation direction perpendicular to an angular velocity axis z, and the Coriolis force of $2mV\Omega$, which is generated in the direction perpendicular to the drive oscillation direction and the angular velocity axis z, is detected by displacement of the oscillator J4 in the Coriolis force generating direction. Here, V represents a velocity of the oscillator J4, and $\Omega$ represents an angular velocity.

In the angular velocity sensor device described above, however, material values such as a damping coefficient and a spring constant of the sensor element change in accordance with a change in ambient temperature and elapsed time. This may cause a drift of zero point of the angular velocity output value and a change in output sensitivity. To avoid these problems, the sensor device can have a function to monitor an amplitude of the oscillator J4 to thereby oscillate the oscillator J4 with a constant amplitude. The sensor device further can have a function to detect a temperature to adjust the sensitivity in accordance with the detected temperature. These functions, however, require an oscillation monitor, a temperature sensor, and circuits therefor, resulting in increased sensor size and increased cost.

SUMMARY OF THE INVENTION

The present invention has been made in view of the above limitations. An object of the present invention is, in an oscillation type angular velocity sensor device, to prevent a drift of zero point of an angular velocity output value and a change in output sensitivity while achieving size reduction and low cost of the sensor device.

According to the present invention, an angular velocity sensor device has a sensor element including a movable portion. The movable portion is oscillated by driving on a specific plane and receives a Coriolis force generated in a specific direction parallel to the specific plane when an angular velocity is generated around an angular velocity axis perpendicular to the specific plane. The sensor device further has a circuit portion electrically connected to the sensor element to receive an output signal from the sensor element. The circuit portion determines the angular velocity by a first signal caused by the Coriolis force and a second signal not caused by the Coriolis force, based on the output signal.

The first signal and the second signal vary in accordance with a change in ambient temperature and elapsed time similarly to each other. Therefore, the angular velocity determined as an output value by the first signal and the second signal used as the reference is prevented from having a drift of zero point thereof and a change in sensitivity. Because it is not necessary to perform another correction by an additional circuit, size reduction and low cost of the sensor device can be achieved.

Preferably, the movable portion includes an oscillator, which is oscillated by the Coriolis force in a detecting direction non-parallel to the specific direction in which the Coriolis force is generated. Accordingly, a force component caused by the Coriolis force and a force component not caused by the Coriolis force are applied to the oscillator in the detecting direction, so that the sensor element outputs the output signal compound from the first signal and the second signal. More preferably, the movable portion includes first and second oscillators respectively oscillated by the Coriolis force in first and second detecting directions defining first and second angles larger than zero with the specific direction. In this case, the sensor element output first and second output signals corresponding to the first and second oscillators.

Preferably, the movable portion includes a first oscillator which is oscillated by driving in a drive direction and a second oscillator which is oscillated by the Coriolis force in a detecting direction defining a specific angle larger than zero with the specific direction. More preferably, the first oscillator is oscillated in the drive direction with a first resonance frequency and the second oscillator is oscillated in the detecting direction with a second resonance frequency approximately equal to the first resonance frequency. Accordingly, a magnitude of detecting oscillation can be increased, and the force components caused by and not caused by the Coriolis force and applied to the second oscillator in the detecting direction can be increased. The first signal and the second signal are enhanced, resulting in high sensitivity and high accuracy.

BRIEF DESCRIPTION OF THE DRAWINGS

Other objects and features of the present invention will become more readily apparent from a better understanding of the preferred embodiments described below with reference to the following drawings, in which;

FIG. 8 is a plan view showing a sensor element in a fifth preferred embodiment of the present invention;

FIG. 17 is a plan view showing a sensor element in a thirteenth preferred embodiment of the present invention;

DETAILED DESCRIPTION OF THE PREFERRED EMBODIMENTS

Figure 1:
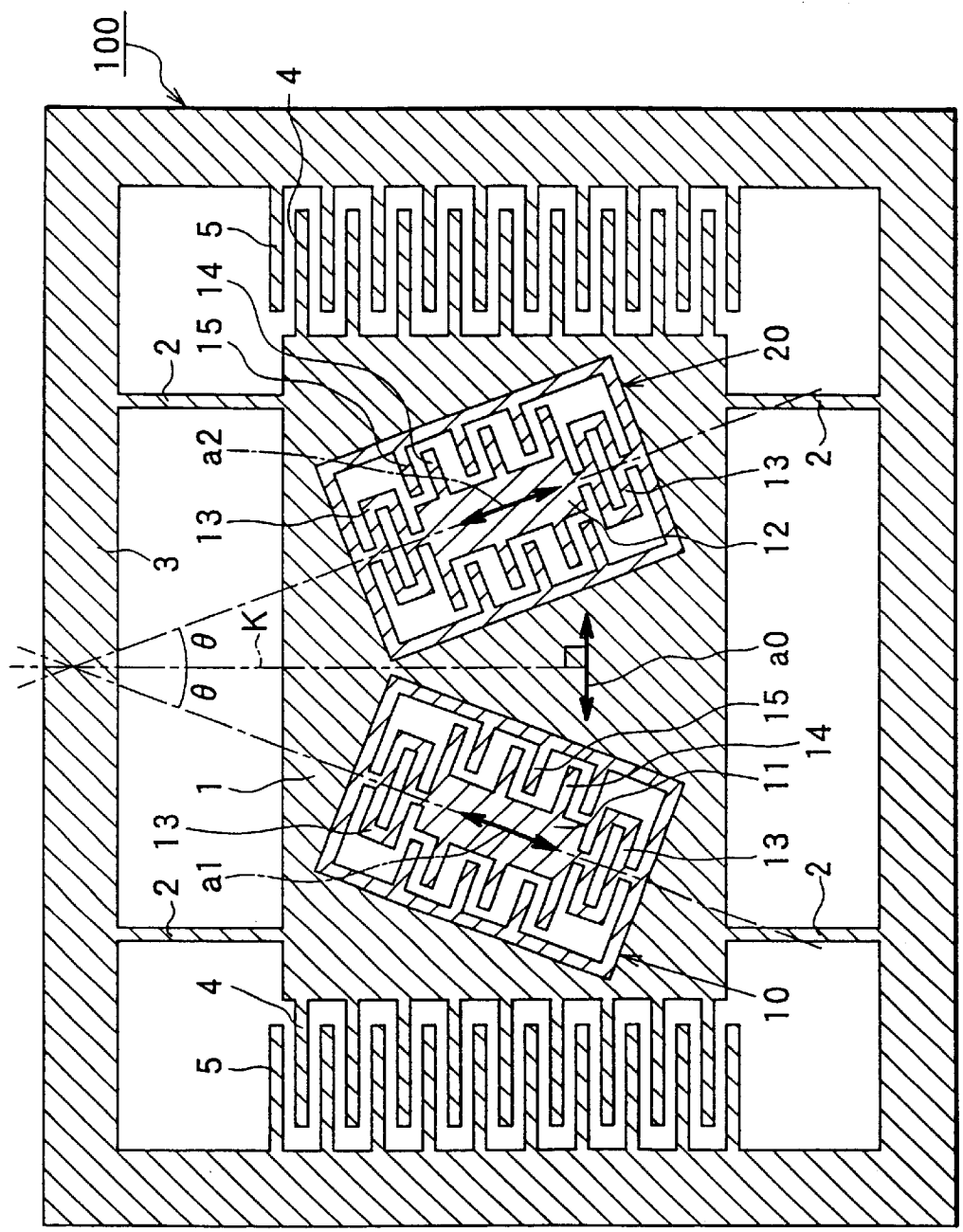
FIG. 1 is a plan view showing a sensor element in a first preferred embodiment of the present invention.

Preferred embodiments of the present invention are explained below referring to the appended drawings, in which some of plan views are partially hatched for the sake of convenience. In the embodiments, the same parts and components are assigned to the same reference numerals.

First Embodiment

An angular velocity sensor device in a first preferred embodiment has a sensor element 100 shown in FIG. 1. The sensor element 100 is a generally rectangular chip that is formed by performing a micro-machine technique to an SOI substrate. The sensor element 100 has a generally rectangular drive oscillator 1 as a movable portion. The drive oscillator 1 is oscillated by driving on a horizontal plane (corresponding to the paper space of FIG. 1) on the substrate. When an angular velocity Ω is generated around an angular velocity axis z perpendicular to the horizontal plane, a Coriolis force is applied to the drive oscillator 1 in the direction parallel to the horizontal plane.

The drive oscillator 1 is connected to a frame portion 3 of the chip (sensor element 100) at opposite sides thereof, via, for example, four horizontally extending beams 2. The drive oscillator 1 defines openings (non-hatched portions) with the frame portion 3 at portions not having the beams 2. The beams 2 enable the drive oscillator 1 to be oscillated independently of the frame portion 3 only in a direction (drive oscillation direction) indicated by an arrow a0 in FIG. 1.

Several pole-like movable electrodes 4 forming a comb shape are provided at opposite sides of the drive oscillator 1 other than the sides connected to the frame portion 3. Several pole-like fixed electrodes 5 forming a comb shape protrude from opposite sides of the frame portion 3 to respectively extend in spaces defined by comb-teeth of the movable electrodes 4. The fixed electrodes 5 have side faces facing the side faces of the movable electrodes 4 while defining gaps, and are electrically independent of the drive oscillator 1 and the movable electrodes 4.

Figure 2:
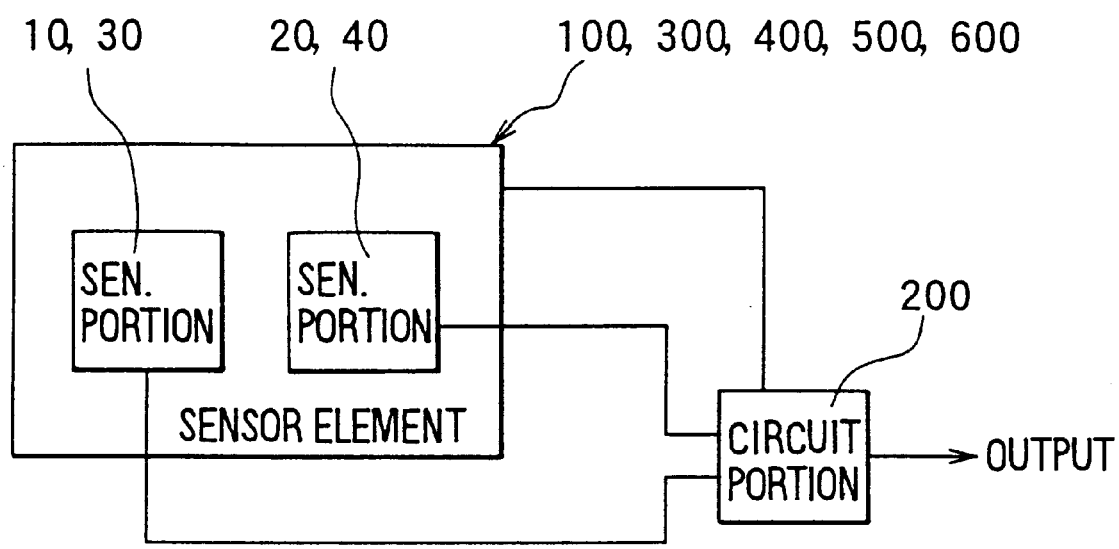
FIG. 2 is a block diagram showing a circuit portion in the first embodiment.

The electrodes 4, 5 are respectively electrically connected to a circuit portion 200 through wiring members, pads, and the like, which are not shown. A circuit diaphragm of the circuit portion 200 is shown in FIG. 2. A voltage is applied across the electrodes 4, 5 from the circuit portion 200 with a specific cycle so that an electrostatic force acts between the electrodes 4, 5. Accordingly, the drive oscillator 1 is oscillated by elastic forces of the beams 2 on the horizontal plane in direction a0 shown in FIG. 1.

The drive oscillator 1 includes two generally rectangular detecting oscillators, i.e., a first detecting oscillator 11 and a second detecting oscillator 12. Each of the first and second detecting oscillators 11, 12 is connected to the drive oscillator 1 via two beams 13 at opposite sides thereof, and is separated from the drive oscillator 1 at portions not having the beams 13 through openings (non-hatched portions in FIG. 1). The beams 13 enable the detecting oscillators 11, 12 to be oscillated independently of the drive oscillator 1 only in respective directions a1, a2 (detecting oscillation directions) indicated by arrows a1, a2, when the angular velocity Ω is applied thereto.

Each of the detecting oscillators 11, 12 has several pole-like movable electrodes 14 forming a comb shape at opposite sides thereof not having the beams 13. Several pole-like fixed electrodes 15 protruding from the drive oscillator 1 with a comb shape are disposed in spaces defined by comb-teeth of the movable electrodes 14 while defining gaps with the movable electrodes 14.

The fixed electrodes 15 are electrically insulated and independent from the drive oscillator 1, the first and second detecting oscillators 11, 12, and the movable electrodes 14 by, for example, grooves filled with an insulation material such as an oxide film. Accordingly, the electrodes 14, 15 can detect the Coriolis force applied to the detecting oscillators 11, 12, as detecting portions.

Thus, in the present embodiment, the detecting oscillators 11, 12 respectively constitute acceleration sensing portions 10, 20 in cooperation with the beams and detecting portions 13 to 15. The acceleration sensing portions 10, 20 are integrated with the movable drive oscillator 1.

When the drive oscillator 1 is oscillated by driving and no angular velocity is generated around the angular velocity axis z, i.e., Ω=0, the detecting oscillators 11, 12 are oscillated together with the drive oscillator 1. When the angular velocity Ω is generated around the angular velocity axis z, the detecting oscillators 11, 12 are oscillated in the direction a1, a2 respectively as shown in FIG. 1 by the Coriolis force, which is produced in the direction (indicated by a dashed line K in FIG. 1) parallel to the horizontal plane and perpendicular to the angular velocity axis z and the drive oscillation direction (direction a0). The oscillations of the detecting oscillators 11, 12 by the Coriolis force are referred to as detecting oscillations, and directions a1, a2 are referred to as detecting oscillation directions.

In the present embodiment, each of the detecting oscillation directions a1, a2 of the detecting oscillators 11, 12 is shifted by an angle θ from the direction K, in which the Coriolis force acts perpendicularly to the direction a0 (drive oscillation direction). The sensor element 100 detects the angular velocity Ω around the angular velocity axis z, with the constitution described above.

Figure 3A:
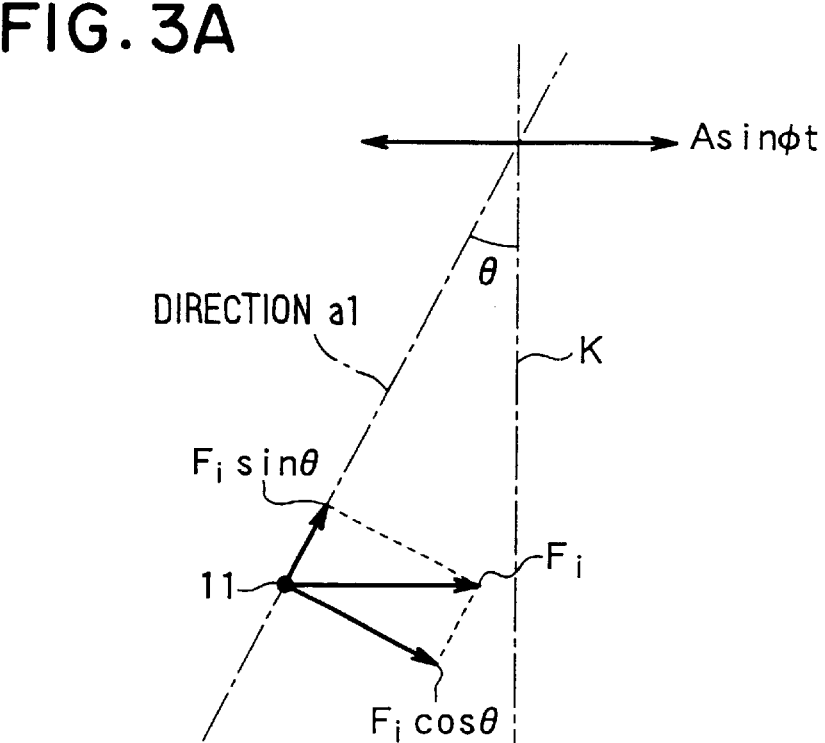
FIGS. 3A and 3B are explanatory views for explaining forces applied to the sensor element shown in FIG. 1.
Figure 3B:
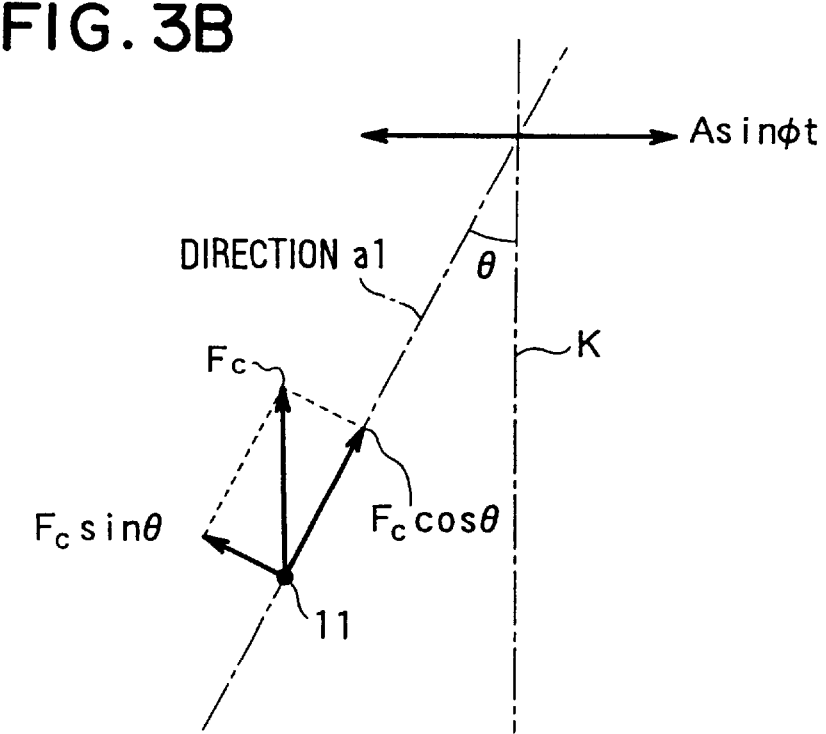

The operation of the sensor element 100 is explained with reference to FIGS. 3A and 3B in more detail. FIGS. 3A and 3B show forces applied to the first detecting oscillator 11 as an example for explaining the forces.

It is assumed that the first detecting oscillator 11 is oscillated by driving with displacement x=Asinϕt (A : driving amplitude, sinϕt : phase) in the drive oscillation direction ao together with the drive oscillator 1. When the angular velocity Ω is generated around the angular velocity axis z, an inertia force Fi is applied to the first detecting oscillator 11 in parallel to the drive oscillation direction a0 as shown in FIG. 3A, and the Coriolis force Fc is applied to the first detecting oscillator 11 in the direction K perpendicular to the drive oscillation direction a0.

Here, the inertia force generally means a force represented by $m_0 \cdot \alpha$ when a force F is applied to a mass $m_0$ to produce an acceleration α according to the Iwanami Physical and Chemical Dictionary. In other word, the inertia force is a generic name of apparent forces appearing on a non-inertia system, and generally includes the Coriolis force therein. However, in the present invention, the inertia force excludes the Coriolis force therefrom.

The detecting oscillation direction of the first detecting oscillator 11 is fixed to the direction a1 by the beams 13. Therefore, referring to FIGS. 3A and 3C, the first detecting oscillator 11 detects a component, Fi·sinθ of the inertia force Fi, and a component, Fc·cos θ, of the Coriolis force Fc, only.

An inertia force Fai and a Coriolis force Fac detected by the first detecting oscillator 11 are represented by the following equations (1) and (2);

$$Fai = ma_0 = -mA\phi^2 \sin \phi t \cdot \sin \theta \quad (1)$$

$$Fac = 2 mv\Omega = 2 m\Omega A \phi \cos \phi t \cdot \cos \theta \quad (2)$$

in which m is the mass of the first detecting oscillator 11, and $a_0$ is an acceleration applied to the first detecting oscillator 11.

Considering the second detecting oscillator 12 similarly to the first detecting oscillator 11, the inertia force Fbi and the Coriolis force Fbc detected by the second detecting oscillator 12 are represented by the following equations (3) and (4);

$$Fbi = -mA\phi^2 \sin\phi t \cdot \sin(-\theta) \quad (3)$$
$$= mA\phi^2 \sin\phi t \cdot \sin\theta$$

$$Fbc = 2m\Omega A\phi \cos\phi t \cdot \cos(-\theta) \quad (4)$$
$$= 2m\Omega A\phi \cos\phi t \cdot \cos\theta$$

The forces appear as displacements of the first and second detecting oscillators 11, 12 in the directions a1, a2 shown in FIG. 1, respectively, and cause changes in distance between the electrodes 14 and 15. The changes in distance between the electrodes 14 and 15 of the oscillators 11, 12 are detected as changes in capacity produced between the electrodes 14 and 15, and are outputted as signals aa, bb from the detecting oscillators 11, 12. The signals aa, bb are represented by the following equations (5), (6), as detected accelerations;

$$aa = -A\phi^2 \sin \phi t \cdot \sin \theta + 2\Omega A\phi \cos \phi t \cdot \cos \theta \quad (5)$$
$$bb = A\phi^2 \sin \phi t \cdot \sin \theta + 2\Omega A\phi \cos \phi t \cdot \cos \theta \quad (6)$$

Thus, in the angular velocity sensor device of the present embodiment, two different output signals aa, bb are respectively outputted from the first and second detecting oscillators 11, 12. The signals aa, bb are then processed in the circuit portion 200 described above. The method for processing the signals is explained with reference to FIG. 4 below.

Figure 4:
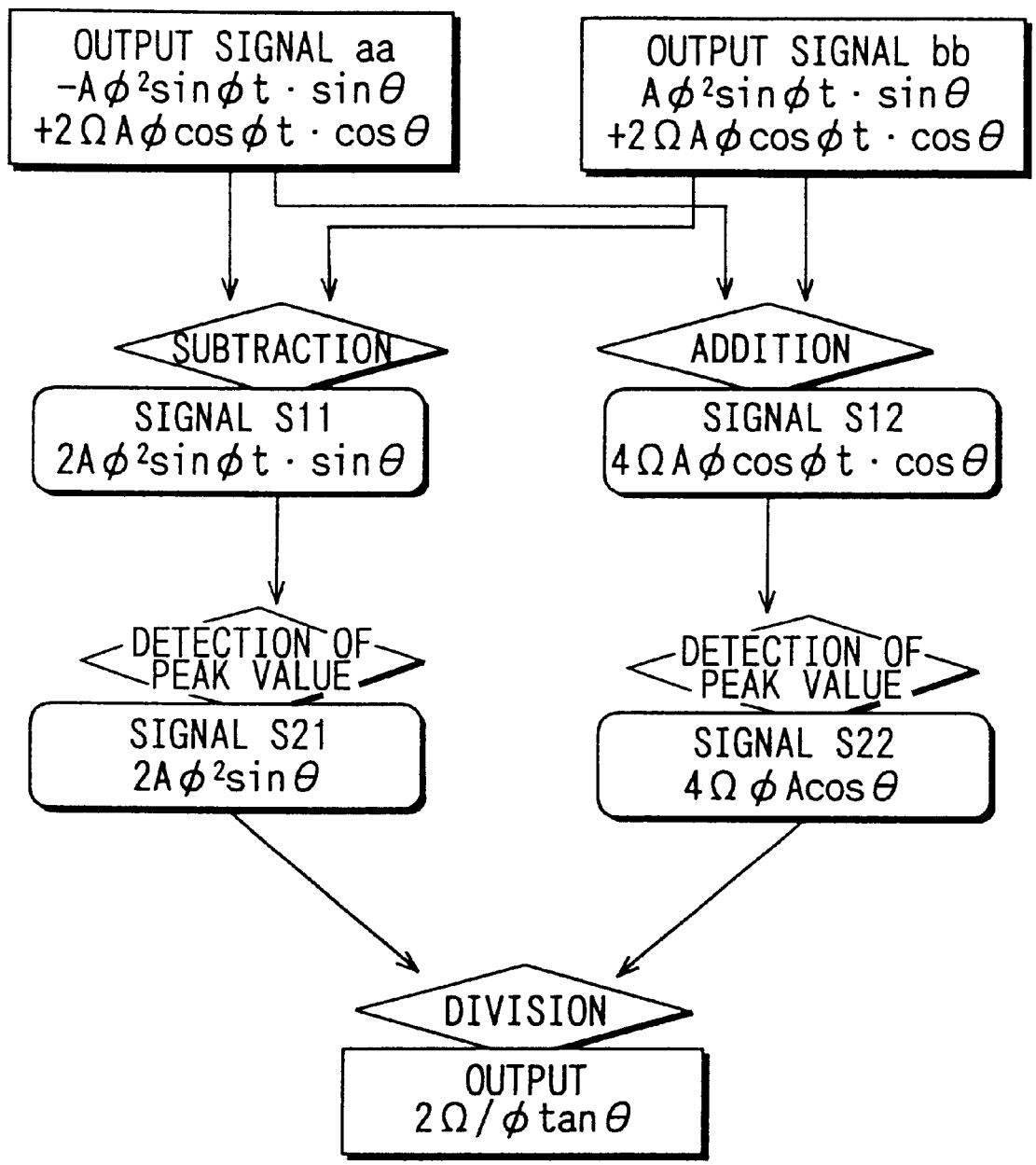
FIG. 4 is an explanatory diagram showing a processing method by the circuit portion in first to third, fifth, eighth to tenth, and twelfth embodiments of the present invention.

As shown in FIG. 4, first, signals S11, S12 are calculated by performing addition and subtraction of the output signals aa, bb. The inertia force, which is not caused by the Coriolis force, determines the signal S11, and the Coriolis force determines the signal S12. Peak values of the signals S11, S12 are detected as signals S21, S22. Then, the signal S22 is divided by the signal S21 to determine output of 2Ω/ϕ tan θ as a detected value of the angular velocity sensor device.

To operated the signals as shown in FIG. 4, the circuit portion 200 has an inertia force calculation means for calculating the inertia force as the signals S11, S21 by performing subtraction of the output signals aa, bb outputted from the first and second detecting oscillators 11, 12, and a Coriolis force calculating means for calculating the values including the Coriolis force as signals S12, S22 by performing addition of the output signals aa, bb. The circuit portion 200 further has an angular velocity calculating means for calculating the angular velocity by operating the signal S21 from the inertia force calculating means and the signal S22 from the Coriolis force calculation means.

It becomes possible for the sensor element 100 to determine the magnitude of the angular velocity by detecting an angular velocity having a specific magnitude after the sensor element 100 is manufactured. Since values of θ and ϕ are previously known, the angular velocity can be determined using the values of θ and ϕ.

The finally obtained output (2Ω/ϕ tan θ) does not depend on the driving amplitude A. Therefore, even when the driving amplitude A changes in accordance with a change in ambient temperature and elapsed time, the detected value is constant. The sensor element 100 needs not have a circuit for controlling the amplitude A constant. However, it is apparent that the sensor device can adopt the circuit for controlling the amplitude A constant.

The sensor device according to the present embodiment can further effectively eliminate adverse effects caused by the change in ambient temperature and the elapsed time in addition the change in the driving amplitude A. For example, there is a case where a resonance frequency of the detecting oscillators 11, 12 is changed by the adverse effects such as changes in spring constant of the beams 13 of the detecting oscillators 11, 12. In this case, the output signals aa, bb of the oscillators 11, 12 may be varied due to a specific force caused by the change in resonance frequency and applied to the oscillators 11, 12.

Even in such a case, however, the inertia force, which is not caused by the Coriolis force, depends on the temperature and the like similarly to the Coriolis force. Therefore, the adverse effects described above equally affect the signals S11 and S12 obtained by performing subtraction and addition of the signals aa, bb. Then, the adverse effects described above can be compensated by performing the division.

Thus, according to the present embodiment, the inertia force, which is usually considered as noise, is utilized to output the signals both depending on the change in ambient temperature and the elapsed time similarly. One of the signals is caused by the Coriolis force, and the other one of the signals is not caused by the Coriolis force. The drifts of the zero point of the output value and the change in output sensitivity can be canceled by processing the two signals.

Therefore, in the sensor device according to the present embodiment, the sensor characteristics hardly vary in accordance with the change in ambient temperature and the elapsed time, and high accuracy and high reliability can be secured. Because the sensor device needs not have additional correction circuits, an oscillation monitor, and the like, size reduction and low cost of the sensor device can be realized simultaneously.

Second Embodiment

A sensor element 300 according to a second preferred embodiment is explained with reference to FIG. 5. In the sensor element 100 of the first embodiment shown in FIG. 1, the movable electrodes 14 for detection and the fixed electrodes 15 for detection are integrated with the drive oscillator 1 to constitute the movable portion, and are oscillated together with the drive oscillator 1 by driving. In the sensor element 300 of the second embodiment, fixed electrodes 35 for detection are separated from drive oscillators 31, 32 not to oscillate together with the oscillators 31, 32.

Further, in FIG. 1, the two detecting oscillators 11, 12 are integrated with the drive oscillator 1 to be oscillated with the same frequency as each other by driving. To the contrary, in the sensor element 300 shown in FIG. 5, the two drive oscillators 31, 32 are connected to each other via a specific beam structure to be oscillated by driving with the same frequency as each other in a direction perpendicular to the angular velocity axis z.

Specifically, the sensor element 300 is a rectangular chip formed by performing a micro-machine technique to an SOI substrate. The oscillators 31, 32 are rectangular and are provided to be oscillated on a horizontal plane (corresponding to the paper space in FIG. 5) on the substrate of the sensor element 300. When the oscillators 31, 32 are oscillated by driving on the horizontal plane and an angular velocity Ω is generated around the angular velocity axis z perpendicular to the horizontal plane, a Coriolis force is applied to the oscillators 31, 32 in a direction parallel to the horizontal plane.

In the sensor element 300, two comb-likely shaped movable electrodes 4 for driving are connected to a frame portion 3 via beams 2 to confront comb-likely shaped fixed electrodes 5 for driving, respectively. The fixed electrodes 5 are supported by opposite sides of the frame portion 3. The two movable electrodes 4 are integrally connected to each other via a support beam 2a. The beams 2 enable a movable portion 38 described below to move only in a direction indicated by arrow a0 (drive oscillation direction). The two oscillators 31, 32 are disposed at both sides of the support beam 2a between the movable electrodes 4 for driving, and are connected to the movable electrodes 4 by, for example, four beams 33 for detection. It should be noted that the scillators 31, 32 serve as first and second detecting oscillators in the present embodiment.

The movable electrodes 4 for driving, the support beam 2a, the oscillators 31, 32, and the beams 33 for detection are integrated with one another, thereby constituting the movable portion 38 in the present invention. The beams 33 enable the oscillators 31, 32 to move only in respective directions a1, a2 (detecting oscillation direction) indicated by dashed lines, independently of the other parts of the movable portion 38, when the angular velocity Ω is applied thereto.

Figure 5:
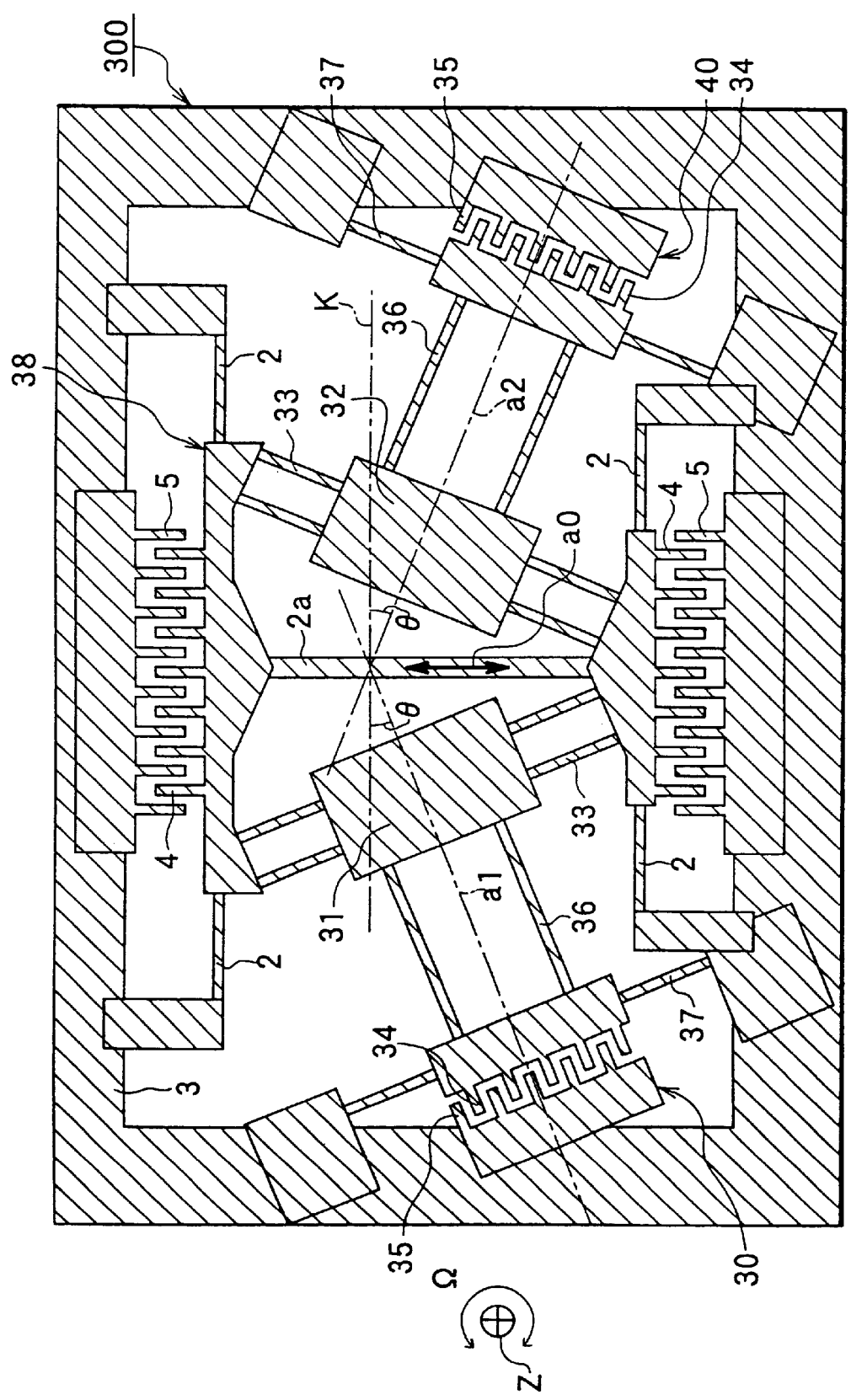
FIG. 5 is a plan view showing a sensor element in a second preferred embodiment of the present invention.

The entire movable portion 38 can be oscillated in the direction a0 shown in FIG. 5 by elastic forces of the beams 2 when electrostatic forces are produced between the electrodes 4, 5 for driving by the circuit portion 200 as in the first embodiment. In practice, oscillation directions of the oscillators 31, 32 by driving are shifted from the direction a0 shown in FIG. 5 slightly, but are approximately parallel to the direction a0.

The oscillators 31, 32 respectively have comb-likely shaped movable electrodes 34 for detection, each of which is connected thereto by, for example, two beams 36. Comb-likely shaped fixed electrodes 35 for detection are disposed to face the movable electrodes 34 with teeth, each of which extends between two teeth of the movable electrodes 34 while defining a gap. The fixed electrodes 35 are supported by opposite sides of the frame portion 3 other than the sides having the electrodes 4, 5 for driving.

The movable electrodes 34 for detection have drive oscillation preventive beams 37 for preventing the movable electrodes 34 from being displaced in directions perpendicular to the directions a1, a2 shown in FIG. 5. Accordingly, the oscillators 31, 32 constitute acceleration sensing portions 30, 40, in cooperation with the beams and the detecting portions 33 to 37, respectively.

When the movable portion 38 is oscillated by driving, the oscillators 31, 32 are oscillated in the direction a0. When the angular velocity Ω is produced, the inertia force and the Coriolis force are applied to the oscillators 31, 32 oscillating by driving. Accordingly, the oscillators 31, 32 are displaced on the horizontal plane corresponding to the paper space of FIG. 5 by the forces described above. The displacements of the oscillators 31, 32 are transmitted to the movable electrodes 34 for detection only in the respective directions a1, a2. That is, the displacements of the oscillators 31, 32 in the directions a1, a2 displace the movable electrodes 34 via the connecting beams 36; however, the perpendicular displacements are restrained by the drive oscillation preventive beams 37.

Accordingly, in the sensor element 300, the angular velocity Ω generated around the angular velocity axis z perpendicular to the paper space can be detected by the two oscillators 31, 32, which are respectively oscillated for detection in the directions a1, a2 shifted at an angle θ from the direction K in which the Coriolis force acts. The direction K is perpendicular to the drive oscillation direction a0.

Based on the same consideration as explained in the first embodiment, two different output signals aa, bb represented by the following equations (7), (8) are outputted from the oscillators 31, 32, respectively. The output signal aa is detected as a change in capacitance between the electrodes 34 and 35 for detection in the direction a1, and the output signal bb is detected as a change in capacitance between the electrodes 34 and 35 for detection in the direction a2.

$$aa = A\phi^2 \sin\phi t \cdot \sin\theta - 2\Omega A\phi \cos\phi t \cdot \cos\theta + \alpha \quad (7)$$

$$bb = A\phi^2 \sin\phi t \cdot \sin\theta + 2\Omega A\phi \cos\phi t \cdot \cos\theta + \alpha \quad (8)$$

At the right side of each equation, the first term is an inertia force term, and the second term is a Coriolis force term. The third term of α, which is not included in the first embodiment, is caused by the movable electrodes 34 displaced by drive oscillation. The third term of α varies with respect to the driving amplitude A similarly to the other terms not to cause disadvantageous at a driving side, but may cause an error with respect to fluctuations at a detection side such as a change in spring constant of the beams 33 for detection.

With respect to the error problem by α, the amplitude of the detecting oscillation can be increased by controlling resonance frequencies at the detection side such as the resonance frequency of the beams 33 to a value equal to or close to the driving frequency. Accordingly, the inertia force component and the Coriolis force component acting in the detecting oscillation direction can be increased. The first and second terms can be increased by the increase in resonance frequency, and accordingly, the term of α is relatively decreased, thereby resulting in reduced error.

The sensor element 300 of the present embodiment described above can provide the same effects as those in the first embodiment by adopting the similar circuit constitution to that explained in the first embodiment referring to FIG. 4. It should be noted that, however, addition and subtraction in FIG. 4 are transposed with each other in the present embodiment. In addition, in the sensor element 300 shown in FIG. 5, the movable portion 38 can be formed to have an identical electrical potential. Therefore, the process becomes simple and an electric coupling becomes small as compared to that shown in FIG. 1.

Third Embodiment

In the respective sensor elements 100, 300 in the first and second embodiments, the two oscillators 11, 12 or 31, 32 are oscillated by driving in the same direction by the common electrodes 4, 5 for driving.

Figure 6:
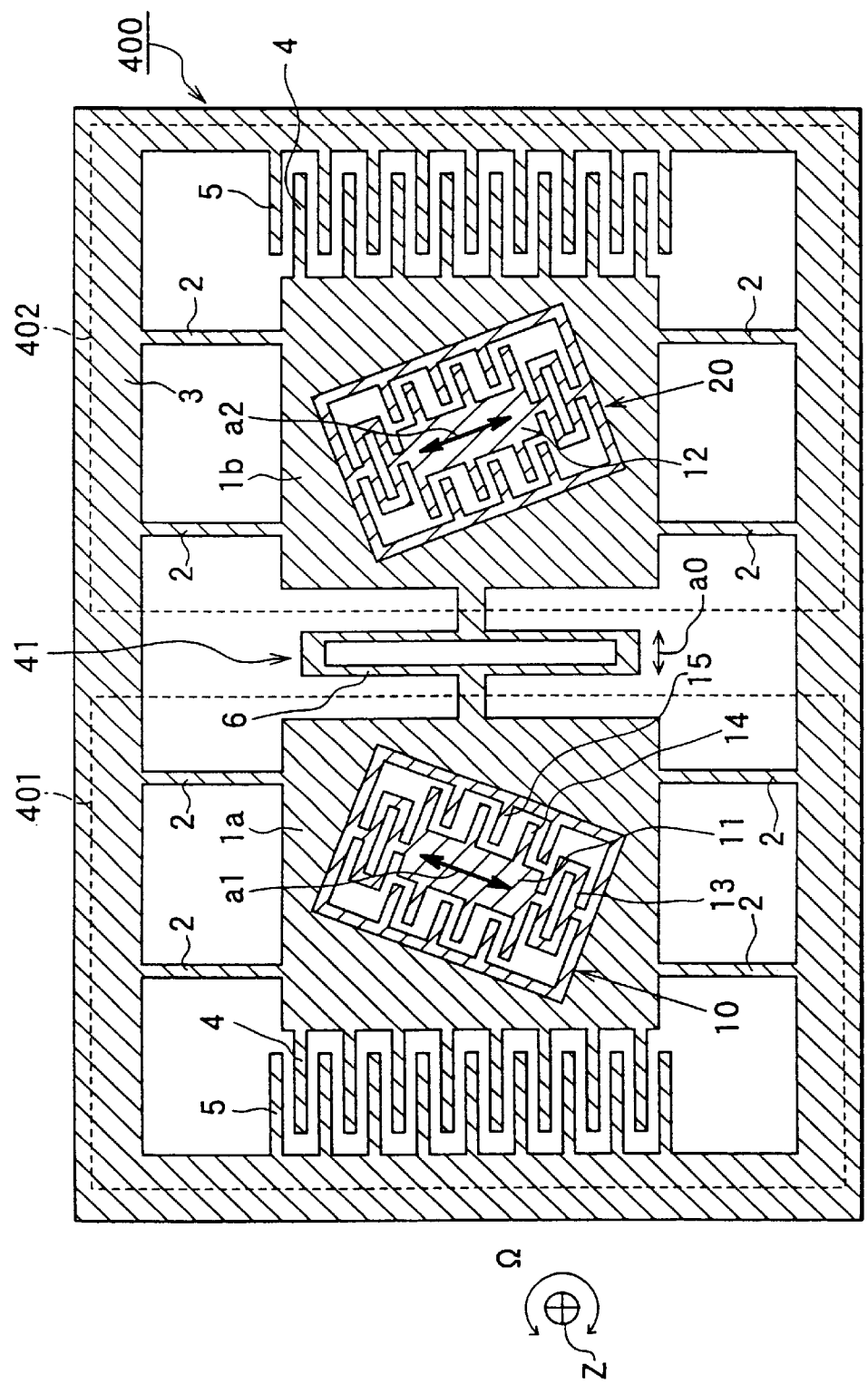
FIG. 6 is a plan view showing a sensor element in third and fourth preferred embodiment of the present invention.

To the contrary, in a sensor element 400 according to a third preferred embodiment, as shown in FIG. 6, two drive oscillators 1a, 1b are provided to hang across a frame portion 3, and acceleration sensing portions 10, 20 respectively including detecting oscillators 11, 12 are provided in the respectively oscillators 1a, 1b. The drive oscillators 1a, 1b are connected to each other by a beam 6 for coupled oscillation. Accordingly, the two oscillators 1a, 1b can perform coupled oscillation.

According to this constitution, the drive oscillators 1a, 1b can be oscillated in an isophase or antiphase with respect to each other in a drive oscillation direction. Accordingly, the angular velocity Ω generated around the angular velocity axis z can be detected by the acceleration sensing portions 10, 20 substantially in the same manner as explained in the first embodiment, and the same effects as those in the first embodiment can be provided.

Also, in the present embodiment, the sensor element 400 has the drive oscillators 1a, 1b as first oscillators, which are oscillated perpendicularly to the angular velocity axis z, and the drive oscillators 1a, 1b respectively hold second detecting oscillators 11, 12 at an inside thereof. The second oscillators 11, 12 are respectively connected to the first oscillators 1a, 1b by beams 13. The second oscillators 11, 12 have detecting portions 14, 15 for detecting a Coriolis force applied thereto when an angular velocity is produced. The first oscillators 1a, 1b are connected to each other by the beam 6 as described above. When the Coriolis force is generated, the second oscillators 11, 12 are oscillated for detection in directions non-parallel to the direction in which the Coriolis force acts.

The number of the beam 6 connecting the first oscillators 1a, 1b for coupled oscillation may be more than one.

Further, the number of the first oscillators may be more than two. It is enough that at least two of the first oscillators are connected to each other by at least one beam for coupled oscillation. Accordingly, since the at least two first oscillators are connected by the beam for coupled oscillation, a coupled oscillation system is provided, and the frequency of the driving force when the driving amplitude becomes maximum becomes the same value (natural frequency) in the first oscillators. Thus, it becomes easy to oscillate the first oscillators at the same driving amplitude by forming the coupled oscillation system.

In the sensor element 400 of the present embodiment, the drive oscillators 1a, 1b including the acceleration sensing portions 10, 20 and the beam 6 for coupled oscillation constitute a movable portion 40. Further, two parts surrounded by broken lines in FIG. 6 can be considered as independent first and second sensor element units 401, 402. The directions indicated by arrows a0, a1, a2 correspond to the directions indicated by arrows a0, a1, a2 in FIG. 1.

Fourth Embodiment

A sensor element in a fourth preferred embodiment has substantially the same structure as that in the third embodiment. A difference between the present embodiment and the third embodiment is a processing method for processing signals when the drive oscillators 1a, 1b are driven to oscillate with driving amplitudes different from each other. The processing method in the present embodiment is explained below using the sensor element 400 shown in FIG. 6.

When the drive oscillators 1a, 1b are oscillated and no angular velocity is generated around the angular velocity axis z (Ω=0), the detecting oscillators 11, 12 oscillate together with the drive oscillators 1a, 1b, respectively. When the angular velocity Ω is generated around the angular velocity axis z, the Coriolis force is generated in a direction parallel to the horizontal plane of the substrate (corresponding to the paper space in FIG. 6) and perpendicular to the angular velocity axis z and the drive oscillation direction (direction a0). Accordingly, the detecting oscillators 11, 12 are oscillated in respective directions a1, a2 shown in FIG. 6.

In an angular velocity sensor, a frequency of a driving force is often set to be approximately equal to a natural frequency at an oscillation system, i.e., resonance is utilized to enhance an output signal. In the third embodiment, the beam 6 for coupled oscillation connects the drive oscillators 1a. Therefore, even when the oscillation structure is not manufactured symmetrically at right and left sides thereof due to a processing error, frequency characteristics of amplitudes of the drive oscillators 1a, 1b have peaks (maximum values) at an identical frequency (natural frequency). Accordingly, when resonance is utilized, the oscillators 1a, 1b have magnitudes close to each other, but strictly not identical with each other.

On the other hand, when the oscillation structure is not manufactured symmetrically at right and left sides thereof due to the processing error in the case where the oscillation is performed without utilizing resonance, the driving amplitudes of the oscillators 1a, 1b are not identical with each other strictly. The method for processing the signals in the present embodiment is used in the case where the difference in driving amplitude between the oscillators 1a, 1b exists.

In the present embodiment, similarly to the first embodiment, the detecting oscillation directions (detecting directions) a1, a2 are shifted at a specific angle θ from the direction in which the Coriolis force acts perpendicularly to the drive oscillation direction a0. With this constitution, the angular velocity Ω is detected. The operation of the sensor element 400 can be explained as explained in the first embodiment referring to FIGS. 3A and 3B.

It is assumed that the first detecting oscillator 11 is oscillated by driving together with the drive oscillator 1a in the direction a0 at x1=Aa sinϕt, in which x1 represents a displacement, Aa represents a driving amplitude, and sin ϕt represents a phase. In this state, when the angular velocity Ω is generated around the angular velocity axis z, the inertia force Fi is applied to the first detecting oscillator 11 in the direction parallel to the drive oscillation direction, and the Coriolis force Fc is applied to the oscillator 11 in the direction K perpendicular to the drive oscillation direction.

Since the detecting oscillation direction of the first detecting oscillator 11 is fixed to the direction a1 by the beams 13, referring again to FIGS. 3A and 3B, the first detecting oscillator 11 detects Fi·sin θcomponent of the inertia force, and Fi·sin θcomponent of the Coriolis force only. Therefore, the inertia force Fai and the Coriolis force Fac, which are detected by the first detecting oscillator 11, are represented by the following equations (9) and (10);

$$Fai = ma_0 = -mAa\, \phi^2 \sin\phi t \cdot \sin\theta \quad (9)$$

$$Fac = 2\,mV\Omega = 2\,m\Omega Aa\phi \cos\phi t \cdot \cos\theta \quad (10)$$

in which m is the mass of the first detecting oscillator 11, $a_0$ is an acceleration applied to the first detecting oscillator 11, and Ω represents the angular velocity.

Similarly, the inertia force Fbi and the Coriolis force Fbc detected by the second detecting oscillator 12 can be represented by the following equations (11) and (12);

$$\begin{aligned} Fbi &= -mAb\phi^2 \sin\phi t \cdot \sin(-\theta) \\ &= mAb\phi^2 \sin\phi t \cdot \sin(\theta) \end{aligned} \quad (11)$$

$$\begin{aligned} Fbc &= 2m\Omega Ab\phi \cos\phi t \cdot \cos(-\theta) \\ &= 2m\Omega Ab\phi \cos\phi t \cdot \cos\theta \end{aligned} \quad (12)$$

in which Ab is the driving amplitude of the second drive oscillator 1b and the second detecting oscillator 12.

The forces appear as displacements of the first and second detecting oscillators 11, 12 in the directions a1, a2 shown in FIG. 6, respectively, and cause changes in distance between the electrodes 14 and 15 for detection. The changes in distance between the electrodes 14 and 15 of the oscillators 11, 12 are detected as changes in capacity produced between the electrodes 14 and 15, and are outputted as signals aa, bb from the detecting oscillators 11, 12. The signals aa, bb are represented by the following equations (13), (14), as detected accelerations;

$$aa = -Aa\phi^2 \sin\phi t \cdot \sin\theta + 2\Omega Aa\phi \cos\phi t \cdot \cos\theta \quad (13)$$

$$bb = Ab\phi^2 \sin\phi t \cdot \sin\theta + 2\Omega Ab\phi \cos\phi t \cdot \cos\theta \quad (14)$$

The signals aa, bb are processed by subtraction and addition in the first embodiment. To the contrary, in the present embodiment, the signals aa, bb are processed as follows. That is, manipulations represented by the following equations (15), (16) are performed to the signals aa, bb.

$$aa' = aa \times Ab \times C \quad (15)$$

$$bb' = bb \times Aa \times C \quad (16)$$

in which C is a constant.

The manipulations can be performed by an amplifier circuit provided in the circuit portion 200. The amplification of the signals may be performed in the first embodiment. In this case, amplification factors of the two signals outputted from the two sensing portions should be approximately equal to each other.

To the contrary, in the fourth embodiment, amplification factors of the two signals are different from each other. The amplification factors of the two signals are Ab×C and Aa×C, respectively. A gain is adjusted so that the two detecting portions 14, 15 have the same output signal amplitude represented by Aa×Ab×C. Accordingly, in the angular velocity sensor device of the present embodiment, the two different output signals aa', bb' are outputted from the first and second detecting oscillators 11, 12, respectively.

Next, the output signals aa', bb' are processed in the circuit portion 200. The processing method of the signals is explained below referring to FIG. 7. The processing method is basically the same as that shown in FIG. 4.

Figure 7:
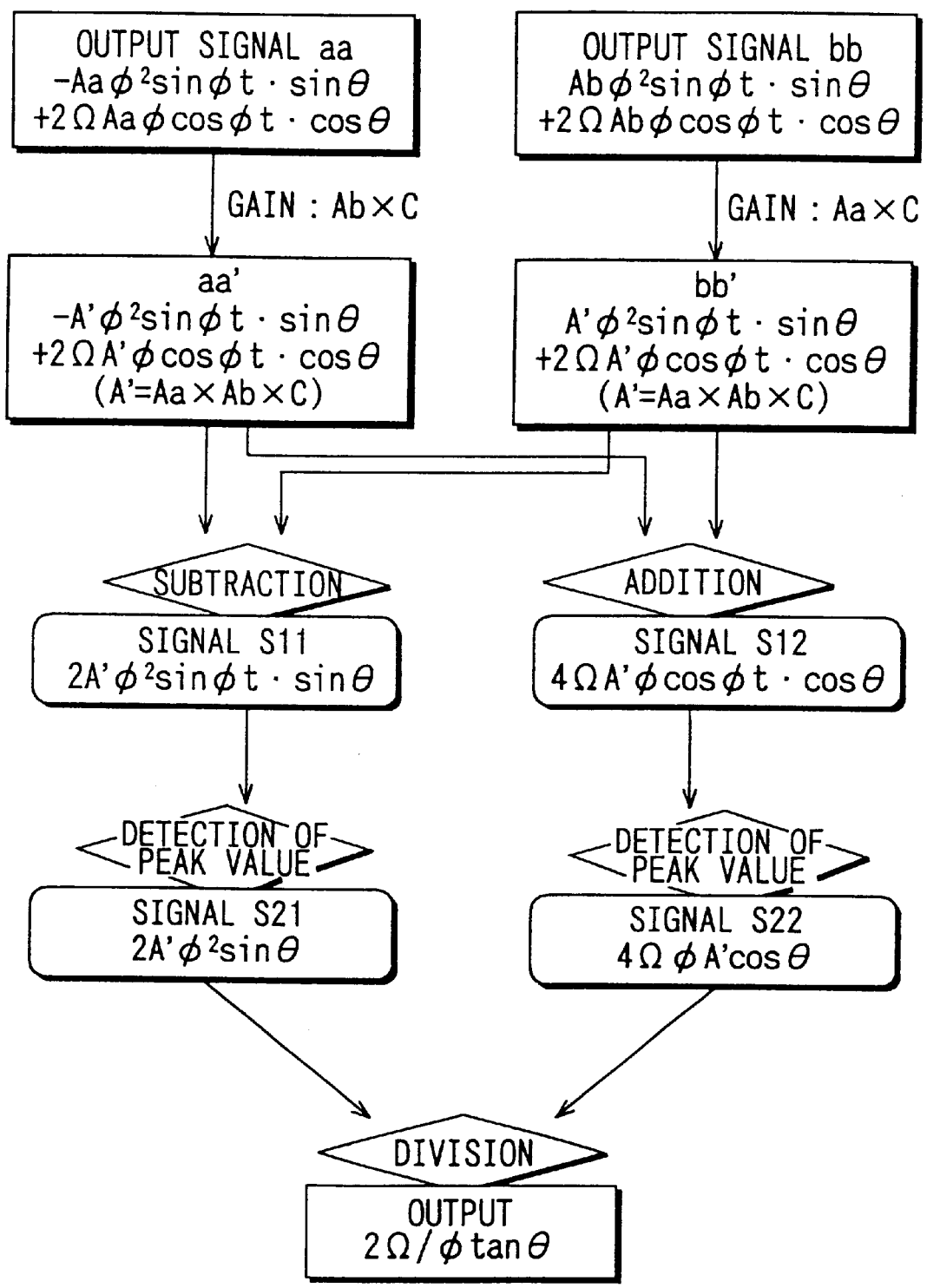
FIG. 7 is an explanatory diagram showing an processing method by a circuit portion in fourth, seventh, and eleventh embodiments of the present invention.

That is, as shown in FIG. 7, first, signals S11, S12 are obtained by performing subtraction and addition of the signals aa', bb'. The inertia force, which is not caused by the Coriolis force, determines the signal S11, and the Coriolis force determines the signal S12. Peak values of the signals S11, S12 are then detected as signals S21, S22. An intensity ratio between the signals S21 and S22 is calculated by division of the signals S21, S22, so that an output of 2Ω/ϕ tan θ is obtained as a detected value of the angular velocity sensor device.

To perform the calculation shown in FIG. 7, the circuit portion 200 has an inertia force calculation means for calculating the inertia force as the signals S11, S21 by performing subtraction of the output signals aa', bb' from the first and second detecting oscillators 11, 12, and a Coriolis force calculating means for calculating the values including the Coriolis force as signals S12, S22 by performing addition of the output signals aa', bb'. The circuit portion 200 further has an angular velocity calculating means for calculating the angular velocity by operating the signal S21 from the inertia force calculating means and the signal S22 from the Coriolis force calculation means.

As in the first embodiment, it becomes possible to calculate the angular velocity Ω by performing a measurement of a specific angular velocity after the sensor element 400 is manufactured. Since values of ϕ, θ are previously known, the angular velocity Ω can be calculated by using the values.

The finally obtained output (2Ω/ϕ tan θ) does not depend on the driving amplitude Aa of the first drive oscillator 1a and the driving amplitude Ab of the second drive oscillator 1b as in the first embodiment. Therefore, even when the driving amplitudes Aa, Ab are varied by the change in ambient temperature and the elapsed time, the obtained value is constant. It is not necessary to adopt a circuit and the like for controlling the driving amplitudes Aa, Ab constant. In addition, other adverse effects caused by the change in ambient temperature and the elapsed time can be eliminated in the present embodiment as explained above.

Thus, the signal caused by the Coriolis force and the signal not caused by the Coriolis force, both of which vary similarly in accordance with the change in ambient temperature and the elapsed time, are conducted using the inertia force that is usually considered as noise. Then, the signal caused by the Coriolis force is calculated using the signal not caused by the Coriolis force as a reference. As a result, the output can be obtained without causing the drift of the zero point and the change in output sensitivity.

Also, in the present embodiment, when the driving amplitudes of the drive oscillators 1a, 1b are different from each other, the gain is adjusted so that the amplitudes of the output signals aa, bb become equal to each other, and the adjusted output signals aa', bb' are calculated. Accordingly, the signal depending on the Coriolis force can be detected with high accuracy.

In the fourth embodiment, the following two methods can be conceivable to adjust the different driving amplitudes of the drive oscillators 1a, 1b. One is to adjust driving voltages of the drive oscillators 1a, 1b so that the driving amplitudes of the drive oscillators 1a, 1b is equal to each other. The other is to feedback-control the driving amplitudes of the drive oscillators 1a, 1b to be equal to each other by monitoring the driving amplitudes, drive oscillation speeds, and the like using an oscillation monitor. According to this method, the driving amplitudes of the drive oscillators 1a, 1b can be controlled to be equal to each other regardless of elapsed time. The methods described above are explained in more detail in sixth and eighth embodiments below.

Fifth Embodiment

In the sensor elements 100, 300, 400 of the first to fourth embodiments, the drive oscillation direction of the drive oscillators is perpendicular to the beams for driving. However, the drive oscillation direction may make an angle other than 90° C. with beams having different spring constants from each other for driving as in a fifth preferred embodiment, provided that the drive oscillation direction makes an angle other than 90° with the detecting oscillation direction. The spring constants of the beams can be made different by changing lengths or widths of the beams so that the beams are not symmetrical with each other.

Specifically, as shown in FIG. 8, a sensor element 500 in the fifth embodiment includes beams having different lengths for drive oscillation. The sensor element 500 includes, similarly to that shown in FIG. 6, a movable portion 51 composed of drive oscillators 1a, 1b connected by a beam 6 interposed therebetween for coupled oscillation. The drive oscillators 1a, 1b include acceleration sensing portions 10, 20 respectively. The acceleration sensing portions 10, 20 are provided in parallel to beams 501, 502 connecting the movable portion 51 to the frame portion 3.

A magnet (not shown) is disposed above the sensor element 500, and current is supplied into wiring members 503 from the circuit portion 200 (see FIG. 2). Accordingly, driving forces are produced in directions c1, c2 indicated by a dashed line in FIG. 8. The beams 501, 502, which are provided on both sides of the drive oscillation axes C1, C2, have different lengths as described above. Therefore, the drive oscillators 1a, 1b are displaced, i.e., are oscillated by driving in respectively directions b1, b2 indicated by dashed lines in FIG. 8. The beams 501, 5802 may have different widths from each other in place of different lengths.

When an angular velocity $\Omega$ is generated around the angular velocity axis z in a state where the drive oscillators 1a, 1b are oscillated in the respective directions b1, b2, Coriolis forces act in respective directions K1, K2 perpendicular to the directions 1a, 1b. Accordingly, the detecting oscillators 11, 12 provided in the drive oscillators 1a, 1b are oscillated by the beams 13 in respective directions a1, a2 shown in FIG. 8, thereby performing detecting oscillation. Thus, in the present embodiment, the drive oscillation directions b1, b2 are not perpendicular to the beams 501, 502 for driving. However, the same effects as those in the first embodiment can be provided in the present embodiment.

In the fifth embodiment, although the drive oscillation is performed by electromagnetic driving, it may be performed by electrostatic driving as in the first embodiment using the electrodes 4, 5 for driving. In this case, the electrodes 4, 5 should be considered not to contact each other during the drive oscillation.

Sixth Embodiment

Figure 9:
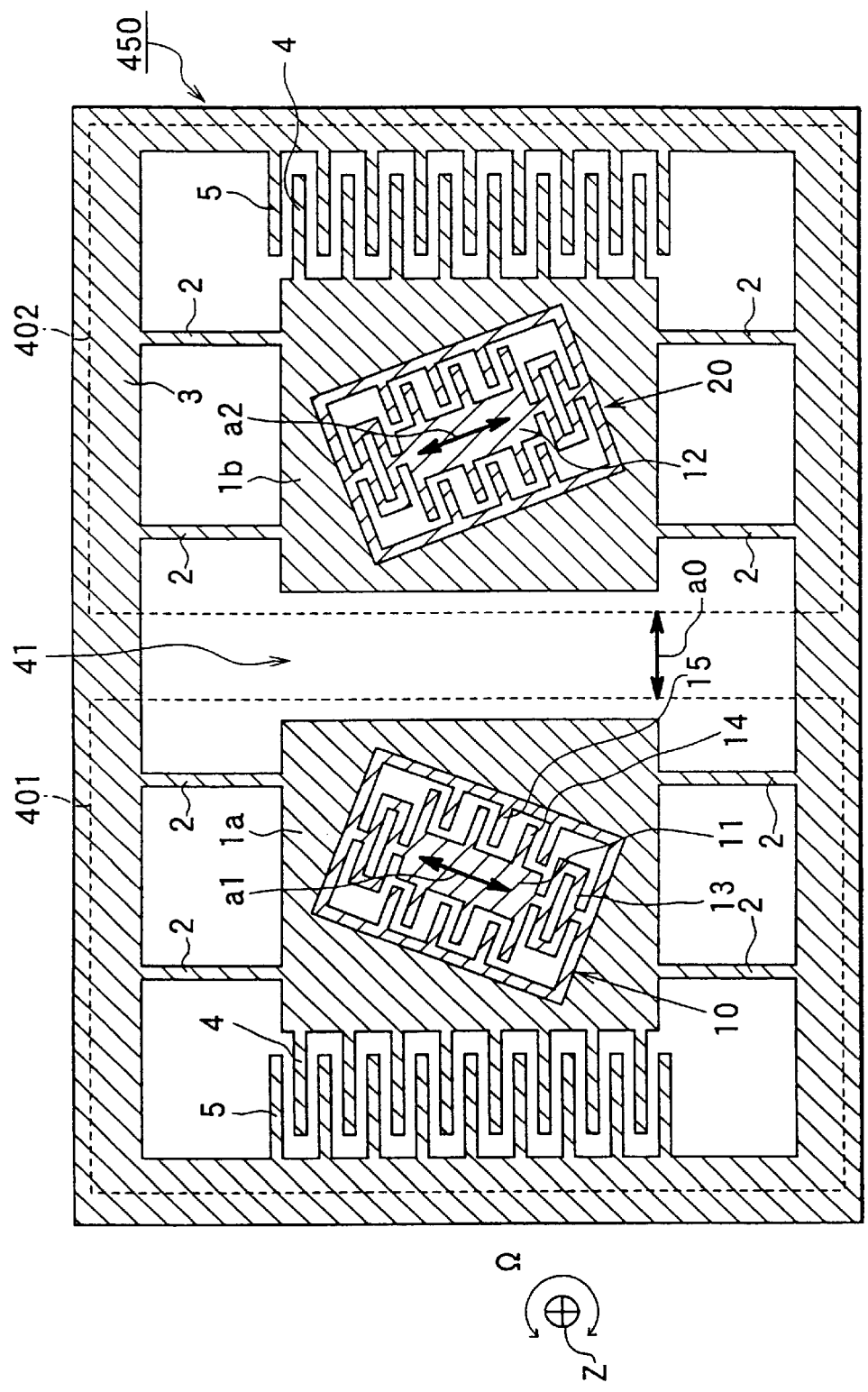
FIG. 9 is a plan view showing a sensor element in sixth and seventh preferred embodiments of the present invention.

A sensor element 450 in a sixth preferred embodiment is shown in FIG. 9. The sixth embodiment is different from the first and third embodiments in the following points.

In the first embodiment, the drive oscillator 1 has the rectangular first and second detecting oscillators 11, 12, and the angular velocity signal is obtained by operating the signals outputted from the two detecting oscillators 11, 12. To the contrary, the present embodiment adopts first and second drive oscillators 1a, 1b, and each of the drive oscillators 1a, 1b has a detecting oscillator 11 or 12. This is a main difference from the first embodiment.

As compared to the third embodiment shown in FIG. 6, the sensor element 400 in the third embodiment has the structure in which the two drive oscillators 1a, 1b are connected to each other by the beam 6 for coupled oscillation. To the contrary, as shown in FIG. 9, the sensor element 450 in the sixth embodiment dispenses with the beam 6. That is, a movable portion 41 in the present embodiment is provided by removing the beam 6 from that in the third embodiment.

In the sixth embodiment, specifically, the drive oscillators 1a, 1b holding the detecting oscillators 11, 12 are oscillated by driving in a direction a0 in FIG. 9, independently. Driving voltages for oscillating the drive oscillators 1a, 1b are adjusted so that the drive oscillators 1a, 1b oscillate at approximately the same driving amplitude. Accordingly, the sensor element 450 in the present embodiment can be operated as in the first embodiment. Causes of the difference in driving amplitude between the drive oscillators 1a, 1b, which should be corrected, are a processing error and the like. However, if there is no processing error and the like capable of producing the difference in driving amplitude, it is not necessary to adjust the driving voltages for oscillating the drive oscillators 1a, 1b.

Even when the processing error occurs between the two oscillators 1a, 1b, the oscillators 1a, 1b can be adjusted to oscillate at the same driving amplitude in the present embodiment. Accordingly, the signal depending on the Coriolis force can be detected with high accuracy by operating (performing subtraction or addition) several signals. The processing method for obtaining the angular velocity signal is substantially the same as that in the first embodiment.

When the drive oscillators are oscillated independently of each other as in the present embodiment, the drive oscillators 1a, 1b can be oscillated in an isophase or antiphase with respect to each other as in the third embodiment. Accordingly, the acceleration sensing portions 10, 20 can detect the angular velocity $\Omega$ generated around the angular velocity axis as in the first embodiment, thereby providing the same effects as those in the first embodiment.

Further, in comparison with the third embodiment, the beam 6 for coupled oscillation is not employed in the present embodiment. Accordingly, the drive oscillators 1a, 1b can be arranged in the chip flexibly as compared to the third embodiment. The flexibility of the arrangement is mainly increased in the direction a0.

Figure 10:
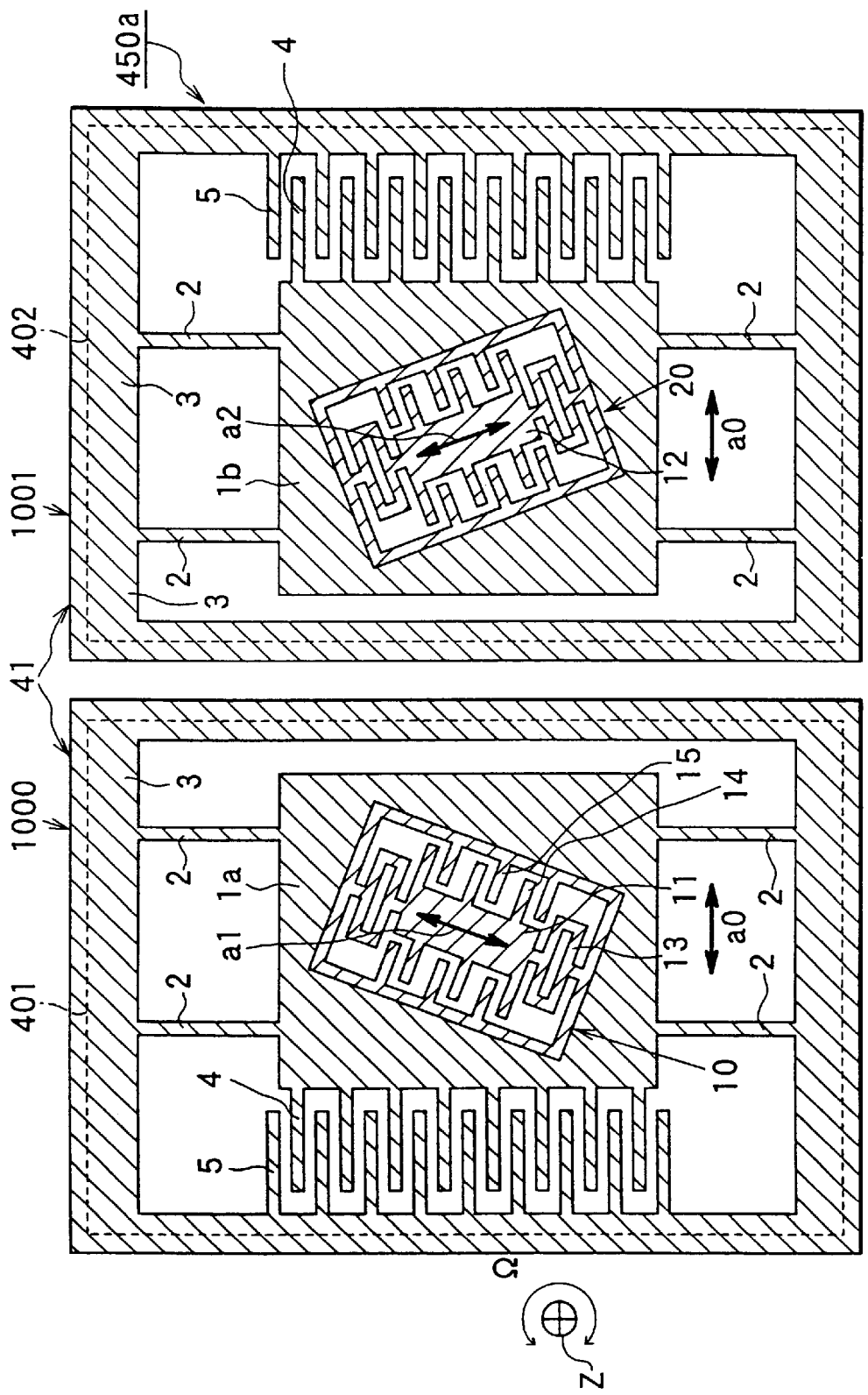
FIG. 10 is a plan view showing two drive oscillators respectively provided on independent chips in the sixth embodiment.

The drive oscillators 1a, 1b may be respectively provided on independent chips as shown in FIG. 10. This results in increased yield. Further, the device (sensor assembly) can be made compact. In FIG. 10, two units 401, 402 respectively including the drive oscillators 1a, 1b are disposed on independent chips 1000, 1001, thereby forming a sensor element 450a. The chips 1000, 1001 may be laminated with each other, resulting in further size reduction of the device.

In the present embodiment, the adjustment for making the driving amplitudes of the drive oscillators 1a, 1b approximately equal to each other is not performed by the circuit for making the driving amplitude A constant as described in the first embodiment. Therefore, the sensor element of the present embodiment can dispense with the circuit for making the driving amplitude A constant as in the first embodiment.

The difference between these circuits is explained below. First, the circuit for making the driving amplitude A constant monitors the amplitude and speed of the drive oscillation during the sensor operation, and feedback-controls the driving voltage to make the driving amplitude constant.

On the other hand, in the adjustment for making the driving amplitudes equal to each other in the present embodiment, the driving amplitudes of the drive oscillators 1a, 1b are measured before shipment, and either or both of the driving voltages of the drive oscillators 1a, 1b is/are controlled so that the driving amplitudes becomes equal to each other. It is not necessary to monitor the amplitude and the speed of the drive oscillation during the sensor operation and to feedback-control the driving voltage.

In this case, t is apparent that the driving amplitudes Aa, Ab of the drive oscillators 1a, 1b are changeable by the change in ambient temperature and the elapsed time during the sensor operation. However, the changes in driving amplitude of the drive oscillators 1a, 1b correspond to each other generally. For example, when the amplitude Aa becomes 1.2 times, the amplitude Ab becomes approximately 1.2 times. Therefore, the amplitudes Aa, Ab are approximately equal to each other even when they are changed during the sensor operation.

Therefore, the circuit for making the amplitude A constant is not necessary to the present embodiment as in the first embodiment. Likewise, the other effects as those in the first embodiment can be provided in the present embodiment.

Figure 11:
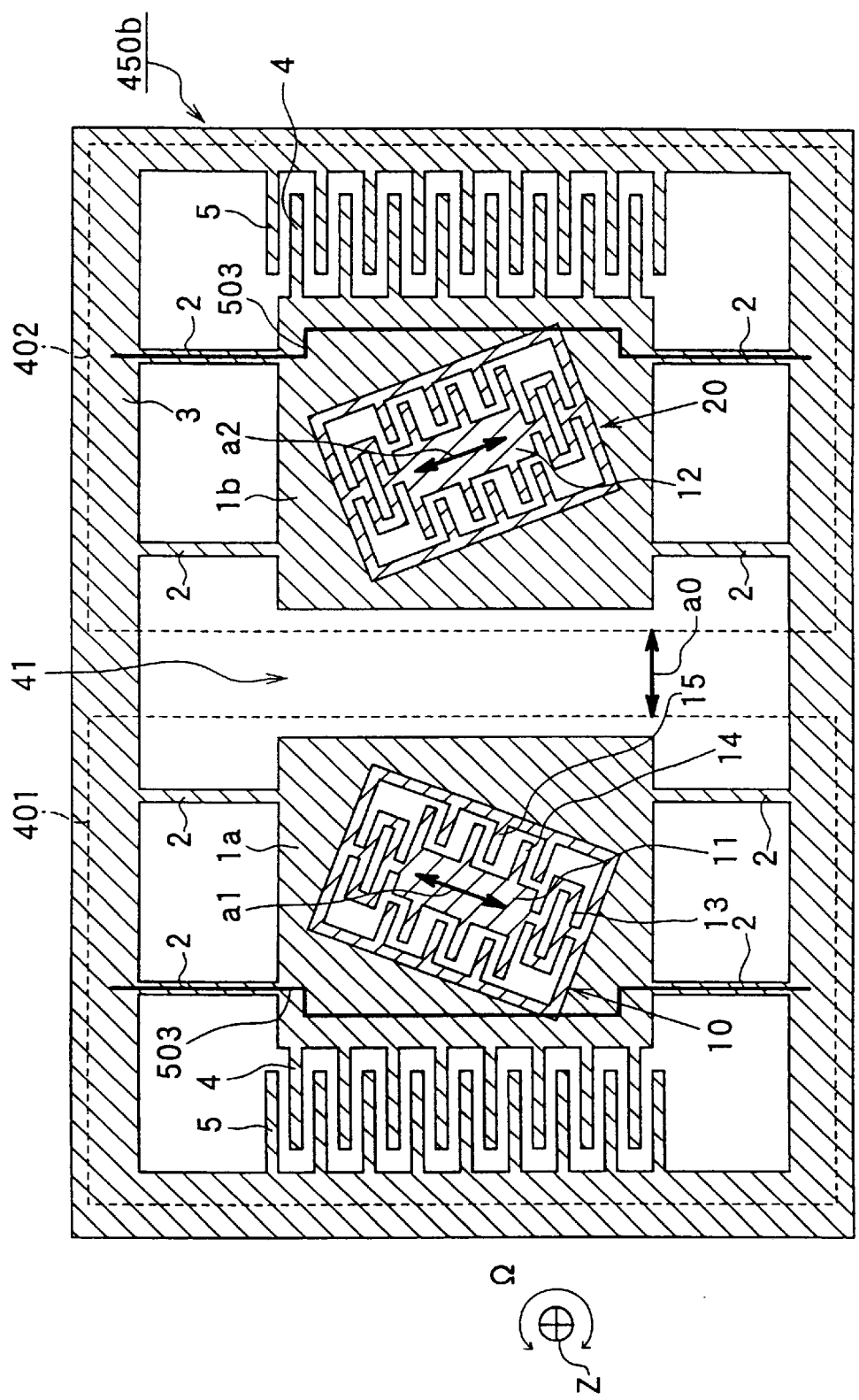
FIG. 11 is a plan view showing an example adopting an electromagnetic driving method in the sixth embodiment.

In FIG. 9, the drive oscillators 1a, 1b are oscillated by an electrostatic driving method. However, an electromagnetic driving method is applicable as shown in FIG. 11. A sensor element 450b shown in FIG. 11 adopts driving wiring members 503 substantially the same as those in the fifth embodiment. The electromagnetic driving method is explained below in more detail.

The wiring members 503 are made of metal such as aluminum, platinum, or titanium, and are disposed on the substrate constituting the sensor element 450b. A current flows in the wiring members 503. Simultaneously, a magnetic filed is generated in a direction perpendicular to the substrate surface (perpendicular to the paper space of FIG. 11) by a permanent magnet or an electromagnet.

When the current flowing in the wiring members 503 changes periodically at, for example, a sine wave or a rectangular wave, the drive oscillators are oscillated accordingly. The processing method (detecting method) for obtaining the angular velocity signal is substantially the same as that described above. The electromagnetic driving can generally have a driving force larger than that of the electrostatic driving.

According to the sixth embodiment, it is not necessary to provide a beam such as the beam 6 shown in FIG. 6 for connecting the first oscillators 1a, 1b. Because of this, driving means such as electrodes for driving are readily disposed around the first oscillators. This is very effective to increase the driving force.

Figure 12:
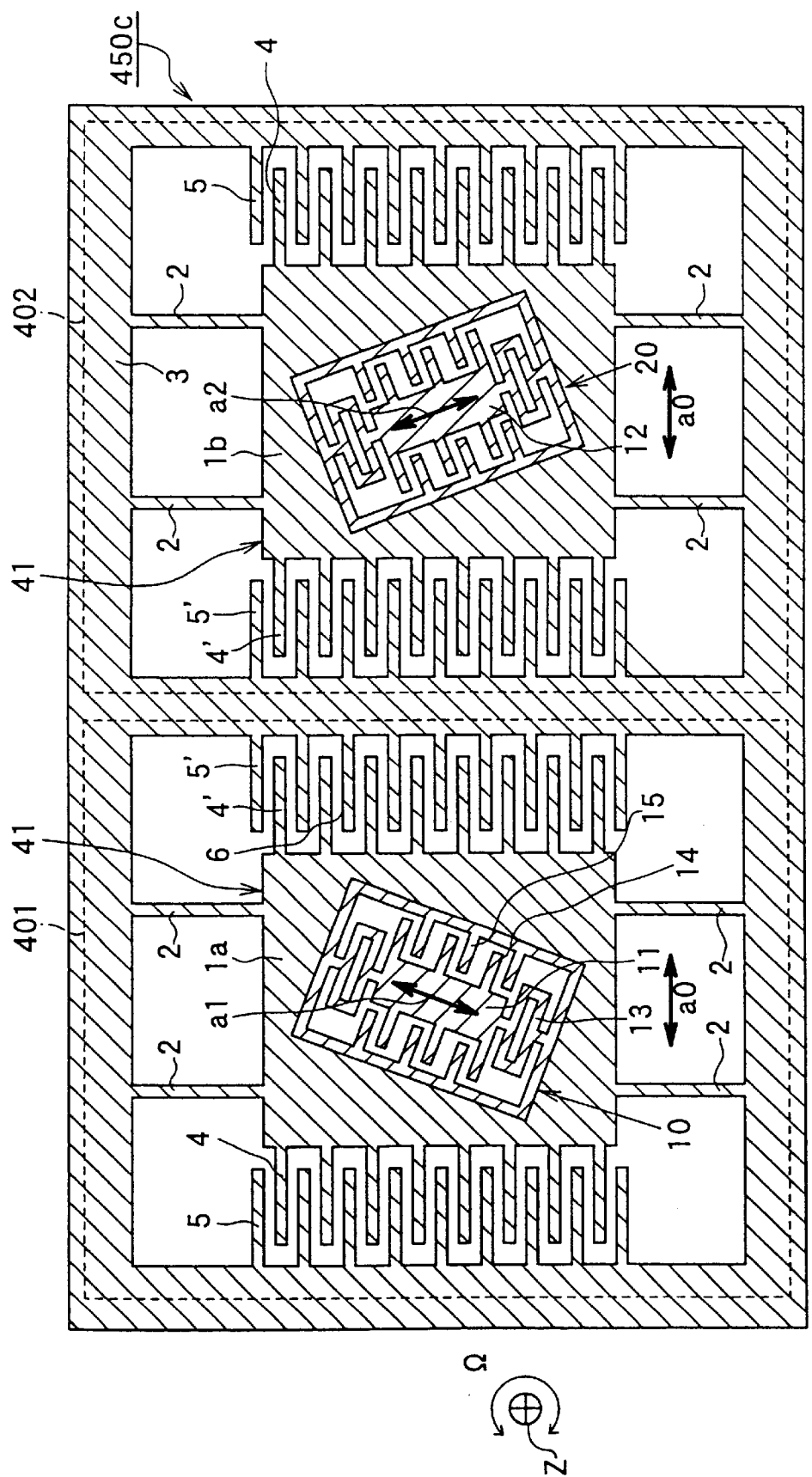
FIG. 12 is a plan view showing a sensor element in an eighth preferred embodiment of the present invention.

For example, in FIG. 9, the comb-likely shaped electrodes 4, 5 for driving are provided only a side of each of the drive oscillators 1a, 1b. However, the electrodes may be provided at both sides of each of the drive oscillators 1a, 1b as shown in FIG. 12. Specifically, as shown in FIG. 12, the sensor element can further have movable electrodes 4' and fixed electrodes 5' for driving at the other side of each drive oscillator in addition to the electrodes 4, 5 provided at one side of each oscillator. Accordingly, the driving force can be increased. Detailed explanation of FIG. 12 is in an eighth embodiment described below.

Seventh Embodiment

A seventh preferred embodiment adopts the same sensor element structure as that in the sixth embodiment, but is different from the sixth embodiment in a processing method of signals when the driving amplitudes of the drive oscillators are different from each other. That is, in the sixth embodiment, the driving amplitudes of the two drive oscillators 1a, 1b (including the detecting oscillators 11, 12) are controlled to be approximately equal to each other in advance. In the seventh embodiment, this adjustment is not performed.

The present embodiment is for the case where the two drive oscillators 1a, 1b have different driving amplitudes from each other by a processing error and the like. The processing method of the signals in the present embodiment is basically the same as that in the fourth embodiment, and therefore, the detailed explanation is not be reiterated.

Briefly, as in the fourth embodiment, different amplification factors Ab×C, Aa×C are set to signals from the two detecting portions 14, 15 in the present embodiment. Accordingly, a gain can be controlled so that both amplitudes of output signals aa', bb' from the detecting portions 14, 15 are set to an equal value of Aa×Ab×C.

Accordingly, in the angular velocity sensor device of the present embodiment, the first and second detecting oscillators 11, 12 respectively output the output signals aa', bb' having the same amplitude. Then, the output of $2\Omega/\phi \tan \theta$ is obtained as a detected value from the angular velocity sensor device by operating the output signals aa', bb' as shown in FIG. 7. The other features and effects are substantially the same as those in the fourth embodiment. Incidentally, it is apparent that the present embodiment can be applied to sensor devices shown in FIGS. 10, 11, and 12 as well.

Eighth Embodiment

FIG. 12 shows a sensor element 450c in the eighth embodiment. The sensor element 450c has a structure similar to that in the sixth embodiment except for the following two points.

As a structural difference, each of drive oscillators 1a, 1b has electrodes 4', 5' for monitoring drive oscillation with comb structures. As described in the sixth embodiment, the electrodes 4', 5' may be used as electrodes for driving.

As an operational difference, in the sixth embodiment, the driving voltages of the drive oscillators 1a, 1b are controlled in advance so that the drive oscillators 1a, 1b have approximately the same driving amplitude. To the contrary, in the present embodiment, the driving voltages are not controlled in advance, and the driving amplitudes of the oscillators 1a, 1b are monitored by the electrodes 4', 5'.

The circuit portion 200 then feedback-controls the driving voltages of the drive oscillators 1a, 1b so that the drive oscillators 1a, 1b have the same driving amplitude. Further, the change in driving amplitude caused by the change in ambient temperature and the elapsed time can be detected, thereby preventing the change in driving amplitude to the elapsed time. The processing method for obtaining the angular velocity signal is substantially the same as that in the first embodiment. Accordingly, the same effects as those in the first embodiment except the advantageous of dispensing with the circuit for making the driving amplitude constant can be provided in the present embodiment.

In the drive oscillators 1a, 1b shown in FIG. 12, the electrodes 4, 5 are used for driving, and the electrodes 4', 5' are used for monitoring the drive oscillations, and vice versa. That is, the electrodes 4', 5' may be used for driving and the electrodes 4, 5 may be used for monitoring the drive oscillation. This relation may be inverted only in one of the oscillators 1a, 1b. For example, in FIG. 12, when the left side first drive oscillator 1a has the electrodes 4, 5 for driving and the electrodes 4', 5' for monitoring the drive oscillation, the right side second drive oscillator 1b can have the electrodes 4', 5' for driving and the electrodes 4, 5 for monitoring the drive oscillation, and vice versa.

Also, in FIG. 12, the sensor element 450c is constructed to perform an electrostatic driving and electrostatic oscillation monitoring method while utilizing electrostatic detection by the comb-shaped electrodes 4', 5' for monitoring the drive oscillations. In addition, it is possible to adopt an electromagnetic detection method for detecting an induced electromotive force, which is generated in wiring members disposed on the drive oscillators 1a, 1b by interaction between the wiring members on the drive oscillators 1a, 1b and a permanent magnet or an electromagnet disposed outside the drive oscillators 1a, 1b. It is also possible to adopt a piezoelectric detection method.

Figure 13:
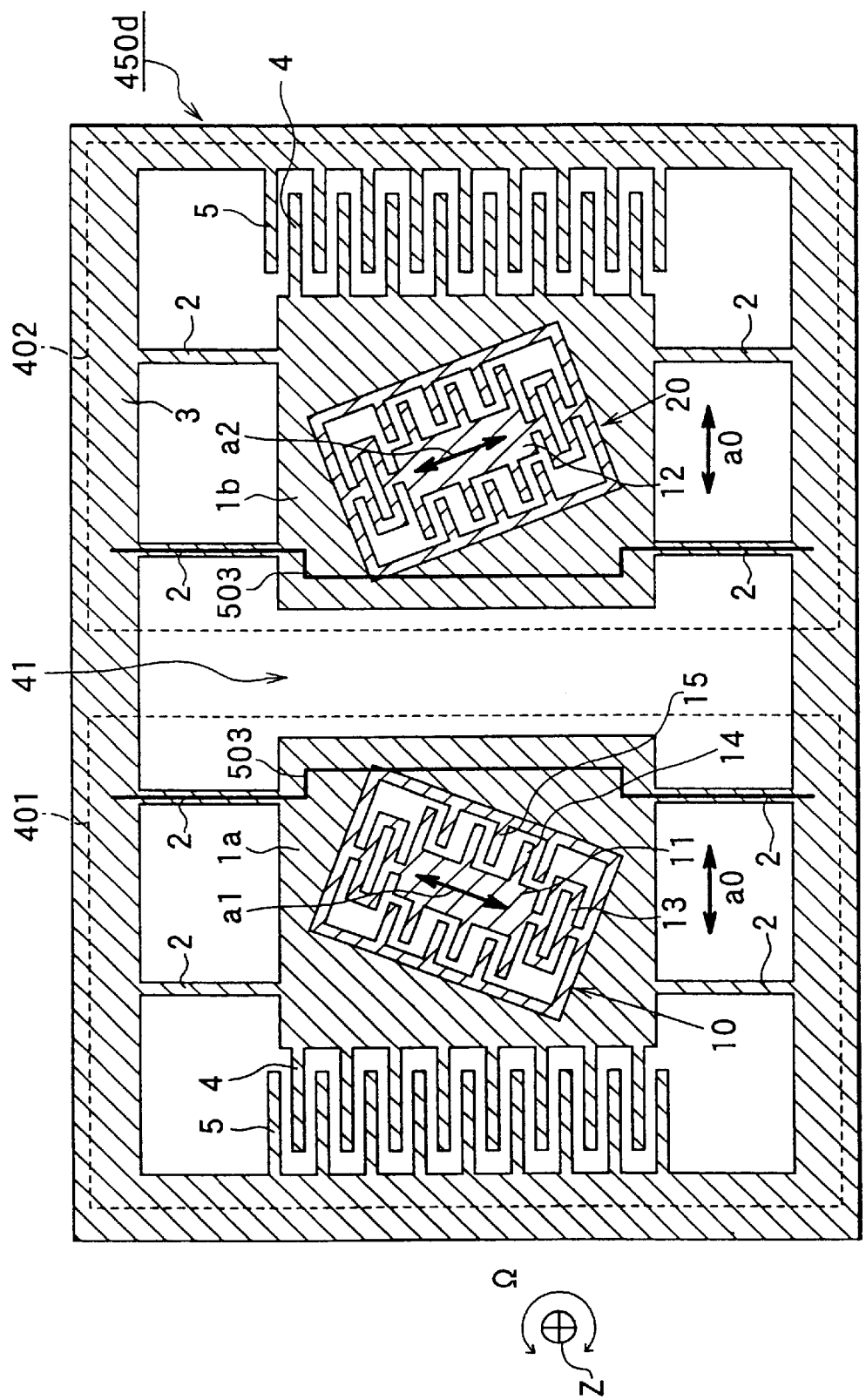
FIG. 13 is a plan view showing an example capable of monitoring a driving amplitude by electromagnetic detection in the eighth embodiment.

FIG. 13 shows a sensor element 450d capable of monitoring amplitudes of drive oscillations of the drive oscillators 1a, 1b by the electromagnetic detection method. In FIG. 13, comb-shaped electrodes 4, 5 are used as electrodes for driving, and wiring members 503 are provided on the respective oscillators 1a, 1b as electrodes for monitoring the drive oscillations. An electrostatic driving and electromagnetic oscillation monitoring method can be performed with this structure.

Figure 14:
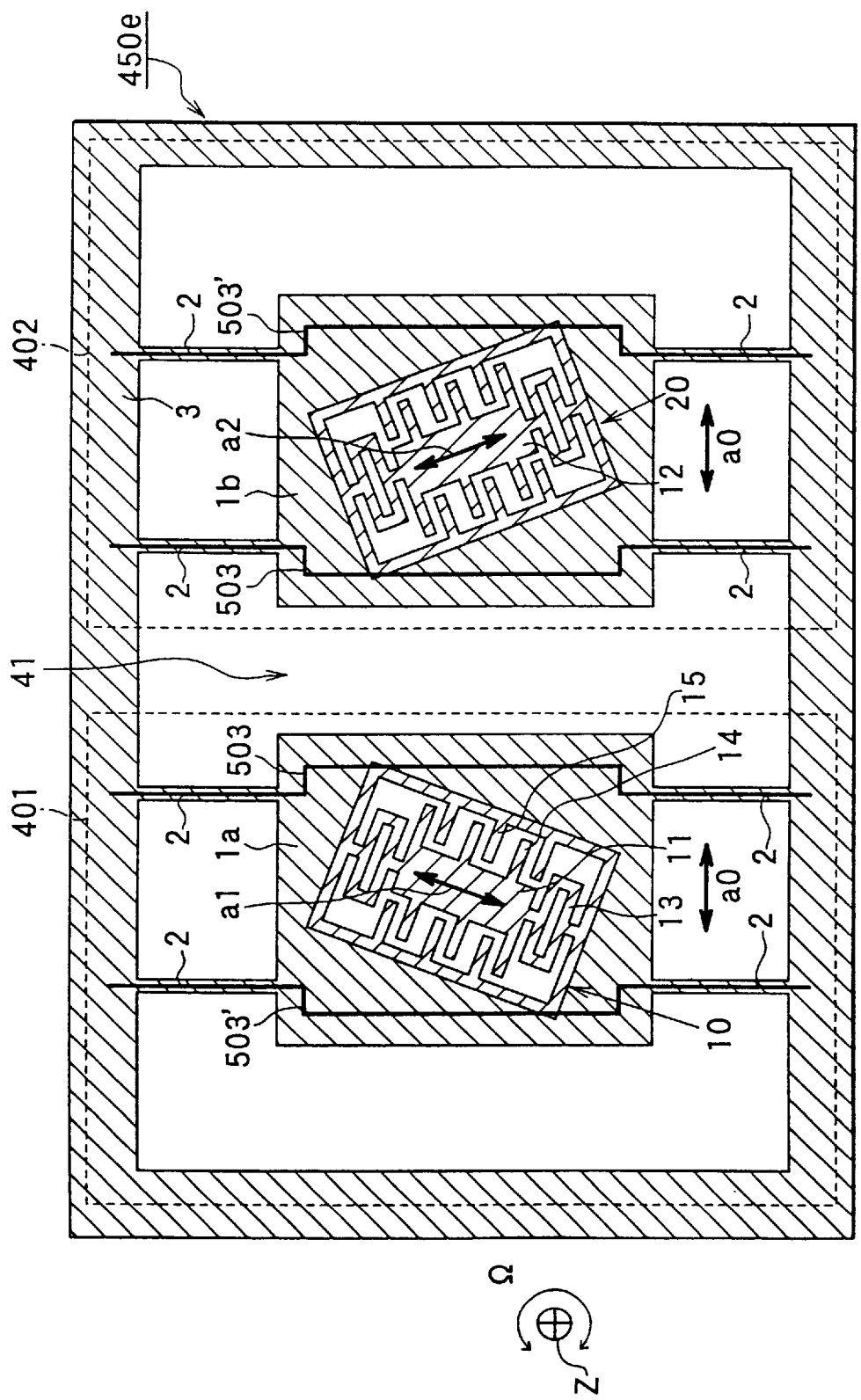
FIG. 14 is a plan view showing an example capable of performing electromagnetic drive and electromagnetic detection in the eighth embodiment.

The relation may be inverted. That is, the wiring members may be used as electrodes for driving, and the comb-shaped electrodes 4, 5 may be used as electrodes for monitoring the drive oscillations to perform an electromagnetic driving and electrostatic oscillation monitoring method. Further, the right side drive oscillator 1b may perform the electrostatic driving and electromagnetic oscillation monitoring method when the left side drive oscillator 1a performs the electromagnetic driving and electrostatic oscillation monitoring method, and vice versa. Furthermore, as in a sensor element 450e shown in FIG. 14, both the drive oscillators can perform an electromagnetic driving and electromagnetic oscillation monitoring method using wiring members 503, 503'.

Thus, according to the eighth embodiment, the sensor element has means 4', 5' for monitoring the drive oscillations of the drive oscillators 1a, 1b. Accordingly, physical quantities (driving amplitudes, drive oscillation speeds, and the like) of the drive oscillations can be monitored, and the amplitudes or the oscillation speeds of the drive oscillations of the oscillators 1a, 1b, or the amplitudes of the output signals from the detecting portions 14, 15 can be adjusted based on the monitored results.

The driving amplitudes of the oscillators 1a, 1b can be controlled to be constant by negative feedback using the monitored results. In this case, even when the processing error and the like occur between the drive oscillators 1a, 1b, the signal caused by the Coriolis force can be obtained with high accuracy by operating (for example, performing subtraction and addition) the signals aa, bb. Because this driving magnitude control is performed based on the monitored results, it can be performed regardless of environmental changes with respect to the device.

Ninth Embodiment

Figure 15:
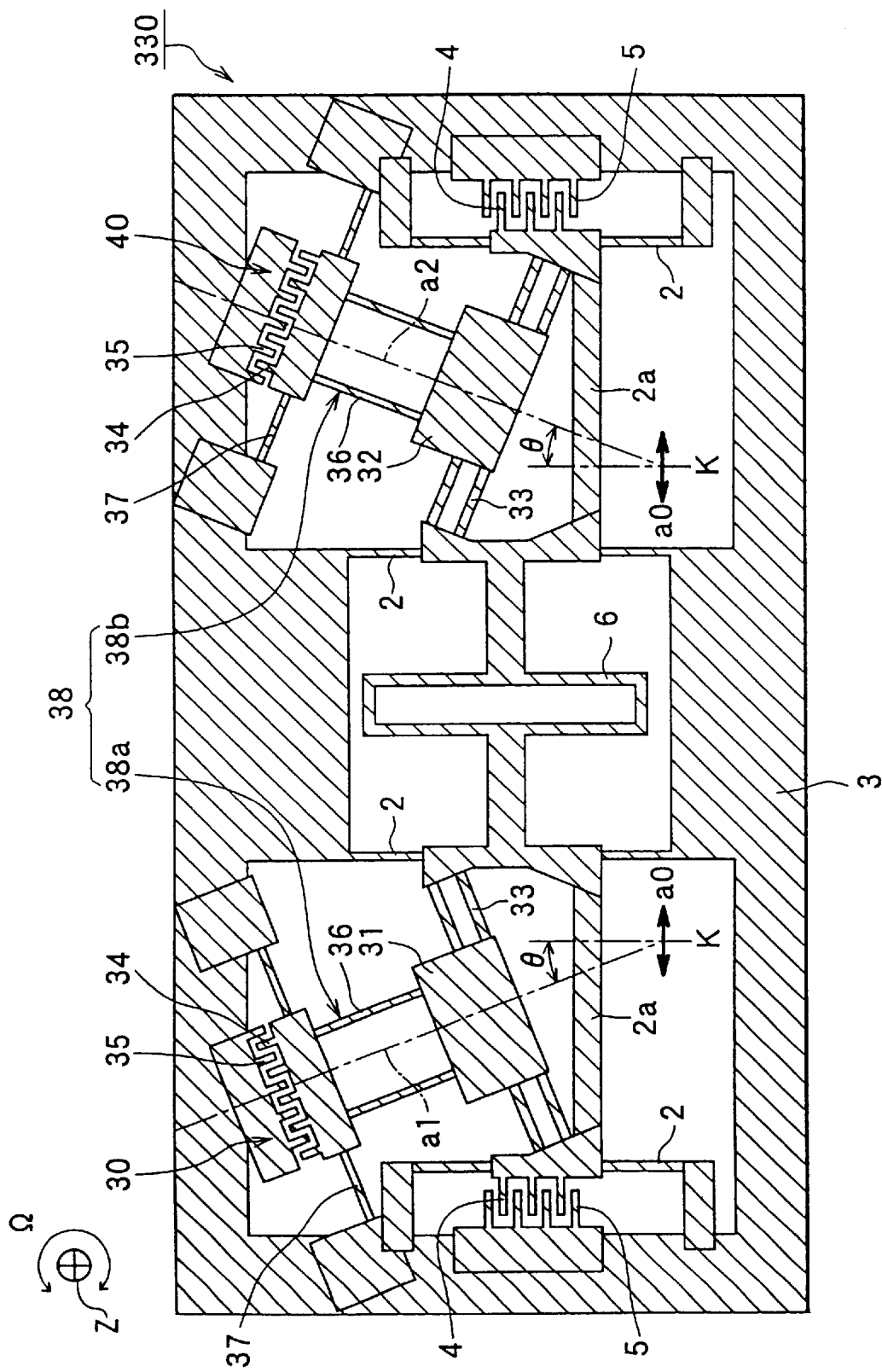
FIG. 15 is a plan view showing a sensor element in a ninth preferred embodiment of the present invention.

FIG. 15 shows a sensor element 330 of an angular velocity sensor device in a ninth preferred embodiment. The present embodiment is a modification of the second embodiment (see FIG. 5). The second embodiment adopts only one movable portion. To the contrary, in the present embodiment, as shown in FIG. 15, a movable portion 38 is composed of first and second movable portions 38a, 38b, which are connected to each other by a beam 6 for coupled oscillation.

In the sensor element 330, likewise, two oscillators 31, 32 have a drive oscillation directional, and respective detecting directions a1, a2 making a specific angle θ with a direction K in which Coriolis forces act. With this structure, an angular velocity Ω generated around an angular velocity axis z perpendicular to the paper space of FIG. 15 can be detected. Here, it should be noted that the directions a0 to a2, and K in FIG. 15 are respectively rotated at 90 from those in FIG. 5, and correspondingly, the oscillators 31, 32, electrodes 4, 5 for driving, electrodes 34, 35 for detection, and beams are rotated as well.

In the first movable portion 38a, the oscillator 31 is supported by a support pole (support beam) 2a via beams 33 for detection. The electrodes 4, 5 for driving are provided at an end of the support pole 2a. The other end of the support pole 2a is connected to the beam 6. Further, the oscillator 31 is connected to the comb-shaped movable electrode 34 for detection via connection beams 36. The movable electrode 34 faces the comb-shaped fixed electrode 35 for detection.

The entire first movable portion 38a can be oscillated by beams 2 only in the direction (drive oscillation direction) a0 indicated by an arrow a0 in FIG. 15. When the angular velocity Ω is generated, the oscillator 31 can be oscillated by the beams 33 for detection only in the detecting oscillation direction a1 indicated by a dashed line in FIG. 15. The movable electrode 34 for detection is prevented by drive oscillation preventive beams 37 from being displaced in a direction perpendicular to the direction a1.

Thus, in the first movable portion 38, the oscillator 31 is oscillated by driving in the direction a0 on the horizontal plane (corresponding to the paper space of FIG. 15) on the substrate. At the drive oscillation, when the angular velocity Ω is generated around the angular velocity axis z perpendicular to the paper space, the inertia force and the Coriolis force are applied to the oscillator 31 to displace the oscillator 31 on the horizontal plane. The displacement is transmitted to the electrode 34 for detection only in the direction a1. That is, the displacement (detecting oscillation of the oscillator 31) in the direction a1 displaces the movable electrode 34 for detection in the same direction a1 via the connection beams 36.

The second movable portion 38b has substantially the same structure as that of the first movable portion 38a except for the detecting oscillation direction. Specifically, in the second movable portion 38b, when the oscillator 32 is oscillated by driving in the direction a0 and the angular velocity Ω is generated around the angular velocity axis z, the oscillator 32 and the movable electrode 34 for detection are displaced in the direction a2 by the inertia force and the Coriolis force.

In the present embodiment, the first movable portion 38a constitutes an acceleration sensing portion 30, and the second movable portion 38b constitutes an acceleration sensing portion 40. The beam 6 enables the movable portions 38a, 38b to perform coupled oscillation. At the coupled oscillation, the oscillators 31, 32 can be oscillated in either of an isophase and an antiphase.

Similarly to the second embodiment, two different output signals aa, bb as represented by the equations (7), (8) are outputted from the oscillators 31, 32 (acceleration sensing portions 30, 40), respectively. The signals aa, bb can be operated by the circuit portion 200 substantially in the same manner as explained referring to FIG. 4, thereby detecting the angular velocity Ω. As a result, the same effects as those in the second embodiment can be provided. In the present embodiment, there is a case where the subtraction and the addition in FIG. 4 are changed with each other. Further, the error caused by α term described in the second embodiment is not considered; however, it can be lessened by the method described in the second embodiment.

In the present embodiment, the movable electrodes 34 of the movable portions 38a, 38b receive the Coriolis forces respectively transmitted from the oscillators 31, 32 through the connection beams 36. Accordingly, the movable electrodes 34 detect the respective detecting oscillations of the oscillators 31, 32 in the detecting oscillation directions a1, a2. It is considerable that the oscillators 31, 32 work as first oscillators and the movable electrodes 34 work as second oscillators.

The number of the beam 6 connecting the first oscillators 31, 32 so that the oscillators 31, 32 can perform coupled oscillation may be more than 1. The number of the first oscillators 31, 32 may be more than 2. In this case, it is sufficient that at least two of the first oscillators are connected to each other by at least one beam for coupled oscillation.

Accordingly, the connected two oscillators can perform coupled oscillation to have the same frequency (natural frequency) of the driving force when the driving amplitude becomes maximum. In the angular velocity sensor, the oscillators are oscillated at the natural frequencies to increase the driving amplitudes. According to the present embodiment, the amplitudes can be easily equalized or brought close to each other by performing the coupled oscillation.

Tenth Embodiment

Figure 16:
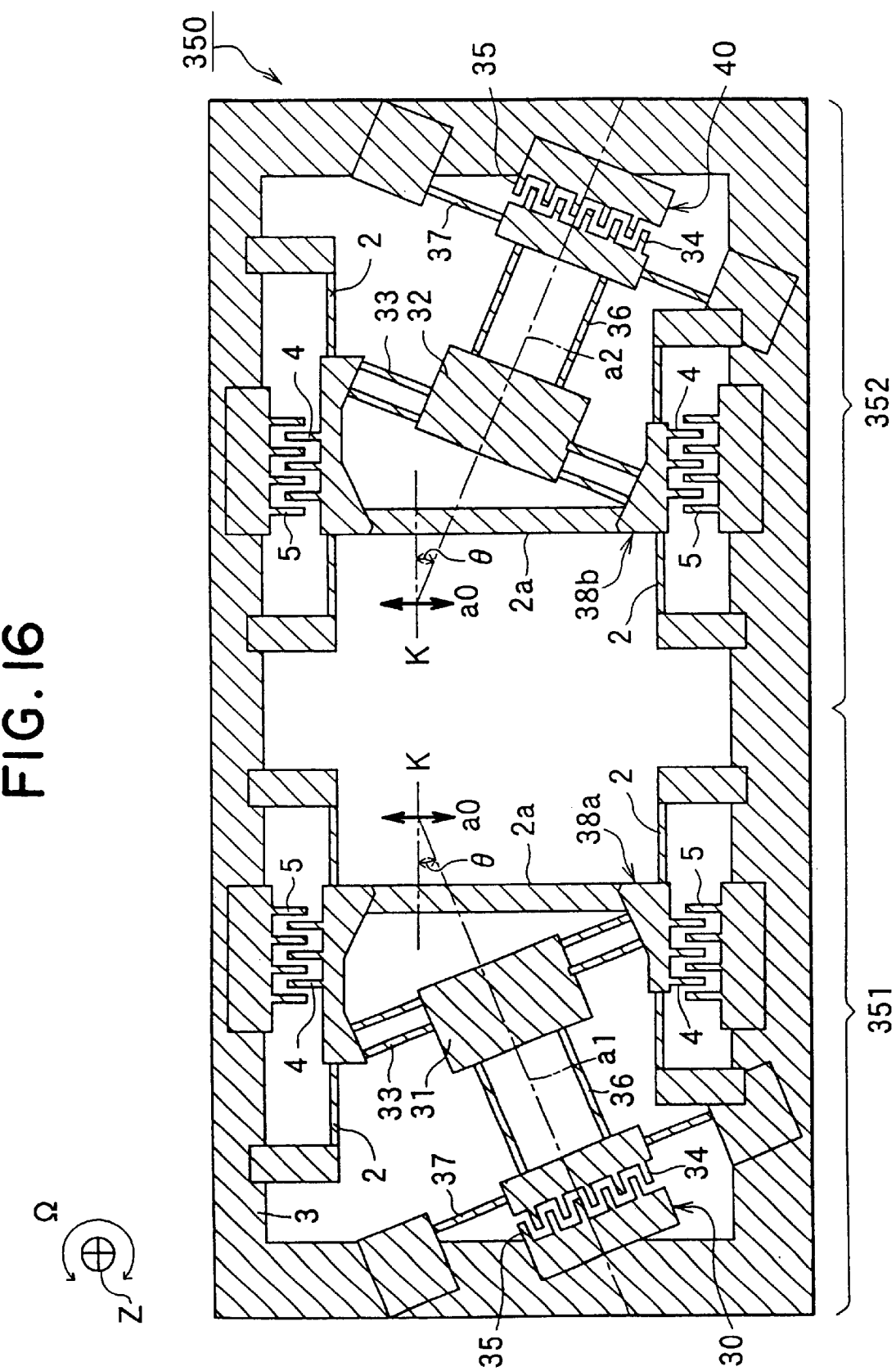
FIG. 16 is a plan view showing a sensor element in tenth to twelfth preferred embodiments of the present invention.

FIG. 16 shows a sensor element 350 of an angular velocity sensor device in a tenth preferred embodiment. The tenth embodiment is a modification of the second embodiment. Compared to the second embodiment shown in FIG. 5, the directions a0, a1, a2, and K are not changed, but the movable portion 38 is divided into two movable portions 38a, 38b. Compared to the ninth embodiment shown in FIG. 15, the directions a0, a1, a2, K are rotated at 90° to correspond to those in FIG. 5, and the beam 6 for coupled oscillation are omitted.

In the present embodiment, because the first and second movable portions 38a, 38b are independent of each other, oscillators 31, 32 of the movable portions 38a, 38b can be flexibly arranged within a chip especially in the direction K. In the sensor element (chip) shown in FIG. 16, the left side half portion constitutes a first sensor element 351, and the right side half portion constitutes a second sensor element 352. The sensor elements 351, 352 may be formed on separate chips, respectively. This arrangement is effective for improving the yield.

Next, an operation in the present embodiment is explained below. The oscillators 31, 32 (movable portions 38a, 38b) are oscillated by driving in the direction a0, respectively. The driving amplitudes of the oscillators 31, 32 are adjusted to be approximately equal to each other in advance by controlling the driving voltages of the oscillators 31, 32. Accordingly, the oscillators 31, 32 are operated substantially in the same manner as in the second embodiment. The difference in driving amplitude between the oscillators 31, 32 (movable portions 38a, 38b) can be produced by a processing error. When no processing error is produced, the oscillators oscillate with the same driving amplitude. Therefore, it is not necessary to control the driving voltage of the oscillators.

The method for processing the signals (detecting method) in the present embodiment is performed substantially in the same manner as that shown in FIG. 4. Accordingly, the same effects as those in the second embodiment can be provided. Further, similarly to the ninth embodiment, in the present embodiment, the oscillators 31, 32 can be considered as first oscillators and the movable electrodes 34 for detection can be considered as second oscillators. The number of the first oscillators 31, 32 may be more than 2.

Further, because the first oscillators 31, 32 are not connected and are independent of each other, the same effects as those in the sixth embodiment can be provided. That is, the flexibility for arranging the first oscillators is improved, and size reduction, decreased cost, and improved yield of the chip can be realized by disposing the oscillators on separate chips. In addition, the driving force can be increased by adopting several driving means.

Eleventh Embodiment

An sensor element in an eleventh preferred embodiment has the same structure as that shown in FIG. 16. The eleventh embodiment is different from the tenth embodiment in the following two points.

As a first point, in the tenth embodiment, the driving amplitudes of the oscillators 31, 32 are adjusted to be approximately equal to each other in advance. To the contrary, in the present embodiment, the adjustment is not performed. Therefore, the oscillators 31, 32 can be oscillated at different driving amplitudes by the processing error. As a second point, a processing method of signals is different from that in the tenth embodiment according to the first point. The processing method is substantially the same as that explained in the fourth and seventh embodiments referring to FIG. 7.

Briefly, amplification factors of signals from two detecting portions 14, 15 are set to be different from each other so that amplitudes of output signals from the detecting portions can be equalized to each other. Then, an output value of $2\Omega/\phi \tan \theta$ is obtained as a detected value of the angular velocity sensor device by processing the output signals as shown in FIG. 7. Accordingly, substantially the same effects as those in the fourth and seventh embodiments can be provided.

Twelfth Embodiment

A twelfth preferred embodiment is a combination of the tenth embodiment shown in FIG. 16 and the eighth embodiment adopting the means for monitoring physical quantities of the drive oscillations of the oscillators. Specifically, the twelfth embodiment is different from the tenth embodiment in the following two points.

As a structural difference, each of the oscillators 31, 32 has two sets of electrodes 4, 5 for driving in the tenth embodiment shown in FIG. 16. To the contrary, in the present embodiment, one of the sets of electrodes 4, 5 is used as electrodes 4', 5' for monitoring drive oscillation. Therefore, a sensor element in the present embodiment has the same exterior appearance as that shown in FIG. 16.

As an operational difference, in the tenth embodiment, the driving amplitudes of the oscillators 31, 32 are controlled to be equal to each other by adjusting the driving voltages of the oscillators 31, 32 in advance. To the contrary, in the present embodiment, the driving amplitudes of the oscillators 31, 32 are detected by the electrodes 4', 5', and are feedback-controlled to be equal to each other as in the eighth embodiment. Accordingly, changes in driving amplitude with respect to the change in ambient temperature and the elapsed time can be detected and prevented simultaneously. The processing method for obtaining the angular velocity signal is substantially the same as that in the tenth embodiment.

The twelfth embodiment adopts the electrostatic detection method using the electrodes 4', 5' for monitoring the drive oscillations. In addition, as described in the eighth embodiment, it is possible to adopt the electromagnetic detection method for detecting an induced electromotive force, which is generated in wiring members disposed on the oscillators 31, 32 by interaction between the wiring members on the oscillators 31, 32 and a permanent magnet or an electromagnet disposed outside the oscillators 31, 32. It is also possible to adopt the piezoelectric detection method.

Thirteenth Embodiment

A thirteenth preferred embodiment is a combination of the fifth embodiment (FIG. 8) including the beams for driving, which are provided non-symmetrically with different lengths or different widths, and one of the sixth to eighth and tenth to twelfth embodiments including the oscillators independent of each other.

FIG. 17 shows a sensor element 550 in the thirteenth embodiment. Similarly to the sixth embodiment shown in FIG. 9, the sensor element 550 has a movable portion 51 composed of drive oscillators 1a, 1b. The drive oscillators 1a, 1b respectively include acceleration sensing portions 10, 20, each of which is disposed in parallel to a pair of beams 501, 502 connecting the oscillators 1a, 1b to a frame portion 3.

Driving forces that change to time periodically are applied to the drive oscillators 1a, 1b using the electrodes 4, 5 for driving, and accordingly, the oscillators 1a, 1b are oscillated in respective directions b1, b2 shown in FIG. 17. The beams 501, 502 having different lengths from each other enable the oscillations described above. Specifically, in the present embodiment, each of the drive oscillators 1a, 1b has two pairs of beams 501, 502, and the longer beam 501 and the shorter beam 502 are arranged alternately. The widths of the beams 501, 502 may be changed in stead of changing the lengths thereof to provide the same effects.

When an angular velocity $\Omega$ is generated around an angular velocity axis z in the state where the oscillators 1a, 1b are oscillated by driving in the directions b1, b2, Coriolis forces are generated in directions K1, K2 respectively perpendicular to the directions b1, b2. As a result, the detecting oscillators 11 12 respectively provided in the drive oscillators 1a, 1b performs detecting oscillations in directions a1, a2 shown in FIG. 17.

Thus, in the present embodiment, the angles respectively defined between the drive oscillation directions b1, b2 and the detecting oscillation directions a1, a2 can be set at an angle(s) other than 90° readily. Accordingly, the same effects as those in the first embodiment can be provided. When driving amplitudes of the drive oscillators are different from each other due to the processing error and the like, the following countermeasures are applicable.

(1) For example, as in the sixth and tenth embodiments, the driving voltages are adjusted in advance so that the driving amplitudes of the driving oscillators are approximately equalized. (2) As in the seventh and eleventh embodiments, a gain of two output signals are adjusted to produce two output signals having the same driving amplitude. (3) As in the eighth and twelfth embodiments, each of the drive oscillators is equipped with a drive oscillation monitor for monitoring the driving amplitude or the driving speed to feedback-control the driving voltage. Accordingly, the driving amplitudes of the drive oscillators are approximately equalized.

In the example shown in FIG. 17, an electrostatic driving method is adopted. However, in this case, because the driving oscillation directions of the drive oscillators are non-parallel to teeth of the electrodes 4, 5 for driving, the gaps between the teeth are changed by the displacements of the drive oscillators, resulting in unstable driving forces. The teeth of the electrodes 4 may abut the teeth of the electrodes 5. Therefore, to avoid this problem securely, an electromagnetic driving method is more suitable to drive the sensor element 550 shown in FIG. 17. In this case, the constitution described in the fifth embodiment referring to FIG. 8 can be adopted.

Fourteenth Embodiment

A fourteenth preferred embodiment is a modification of the sensor element 100 shown in FIG. 1. When the signal caused by the Coriolis force and the signal not caused by the Coriolis force are divided from each other, it is desirable that the magnitudes of both signals are close to or approximately equal to each other. That is, when the angular velocity $\Omega$ to be detected is small, because the Coriolis force is small, the inertia force should be made small.

To decrease the inertia force, it is necessary to decrease the angle θ in FIG. 1. In this case, however, it is difficult to form the detecting oscillators 11, 12 with the detecting oscillation directions a1, a2 defining the same angle with the direction K. That is, in FIG. 1, there may arise a case where the angle θ between the direction a1 and the direction K is different from the angle θ between the direction a2 and the direction K. The present embodiment is applicable to such a case.

When the angle between the direction a1 and the direction K is referred to as angle θ1 and the angle between the direction a2 and the direction K is referred to as angle θ2, the signals aa, bb outputted from the detecting oscillators 11, 12 (acceleration sensing portions 10, 20) are represented by the following equations (17), (18):

$$aa = -A\phi^2 \sin \phi t \cdot \sin \theta 1 + 2\Omega A\phi \cos \phi t \cdot \cos \theta 1 \quad (17)$$

$$bb = A\phi^2 \sin \phi t \cdot \sin \theta 2 + 2\Omega A\phi \cos \phi t \cdot \cos \theta 2 \quad (18)$$

Considering that the angles θ1, θ2 are close to zero, the equations (17), (18) can be approximated into the following equations (19), (20);

$$aa = -A\phi^2 \theta 1 \sin \phi t + 2\Omega A\phi \cos \phi t \quad (19)$$

$$bb = A\phi^2 \theta 2 \sin \phi t + 2\Omega A \phi \cos \phi t \quad (20)$$

Figure 18:
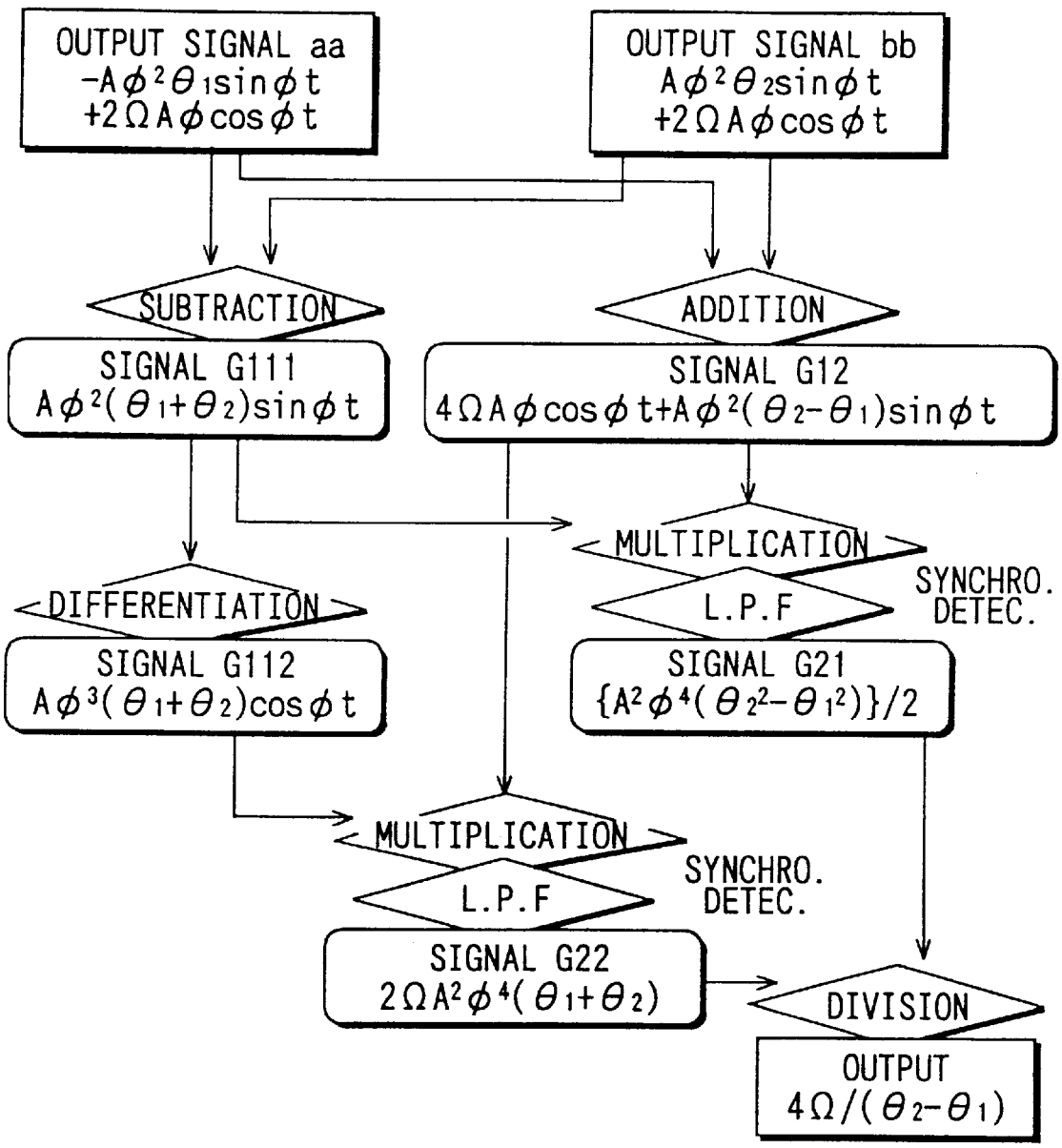
FIG. 18 is an explanatory diagram for explaining a processing method by a circuit portion in a fourteenth preferred embodiment of the present invention.

FIG. 18 shows a processing method of the signals using a circuit portion 200 in the fourteenth embodiment. Signals G111, G12 are obtained by performing subtraction and addition of the signals aa, bb respectively outputted from the acceleration sensing portion 10, 20. The signal G111 is caused by the inertia force, and the signal G12 is caused by the inertia force and the Coriolis force.

A signal G112 is obtained by shifting the phase of the signal G111 by 90 degrees. Then, signals G21, G22 are obtained by performing synchronous detection to the signal G12 using the signals G111 and G112 as references. The phase shift of the signal G111 can be performed by, for example, a differentiate circuit.

The synchronous detection can be performed by, for example, a multiplication circuit and a low-pass filter (L.P.F).

The signal caused by the inertia force and the signal caused by the Coriolis force have phases different from each other by 90 degrees always. Therefore, the signal G21 caused by the inertia force and the signal G22 caused by the Coriolis force can be provided by performing the synchronous detection. An output of 4Ω/(θ2−θ1) is obtained by performing division of the signals G21 and G22 as a detected value of the angular velocity sensor device.

Even when the values of the angles θ1, θ2 are not known, the value of (θ2−θ1) can be known by measuring an output under a specific angular velocity after the sensor element 100 is manufactured. Accordingly, the magnitude of the angular velocity Ω can be determined using the value of (θ2−θ1).

Thus, the circuit portion 200 of the present embodiment has a function for detecting the signal G22 caused by the Coriolis force and having a phase which is shifted by 90° from that of the signal G21. The signal G21 is caused by the inertia force and is not caused by the Coriolis force. The angular velocity can be calculated by performing the division and determining an intensity ratio between the signals G21 and G22.

The finally obtained output of 4Ω(θ2−θ1) does not depend on the driving amplitude A of the drive oscillator 1. Therefore, the value of 4Ω/(θ2−θ1) is constant even when the driving magnitude A varies by the change in ambient temperature and the elapsed time. The circuit for controlling the driving amplitude A constant needs not be adopted. Further, there is a case where the output signals aa, bb vary upon receiving a force produced by the change in driving amplitude and the like of the oscillators 11, 12 due to the change in ambient temperature and the elapsed time. The changes of the output signals aa, bb affect the signals G21 and G22 equally by performing subtraction and addition, and can be canceled by performing division.

In a case where the Coriolis force is detected by performing synchronous detection using the driving waveform, when the phase of the signal caused by the Coriolis force changes by the temperature and the like, an output error may occur. To the contrary, in the present embodiment, the Coriolis force is detected by performing the synchronous detection using the signal cause by the inertia force (not caused by the Coriolis force) as a reference signal. Therefore, even when the phase of the signal caused by the Coriolis force changes due to the temperature and the like, any output error is not produced, because the signal caused by the inertia force changes in phase similarly to the signal caused by the Coriolis force.

According to the sensor device in the present embodiment, as in the first embodiment, sensor characteristics do not vary in accordance with the change in ambient temperature and the elapsed time, resulting in high accuracy and high reliability. Because additional correction circuits, oscillation monitors, and the like are not required to the sensor element, low cost and size reduction can be realized.

Figure 19:
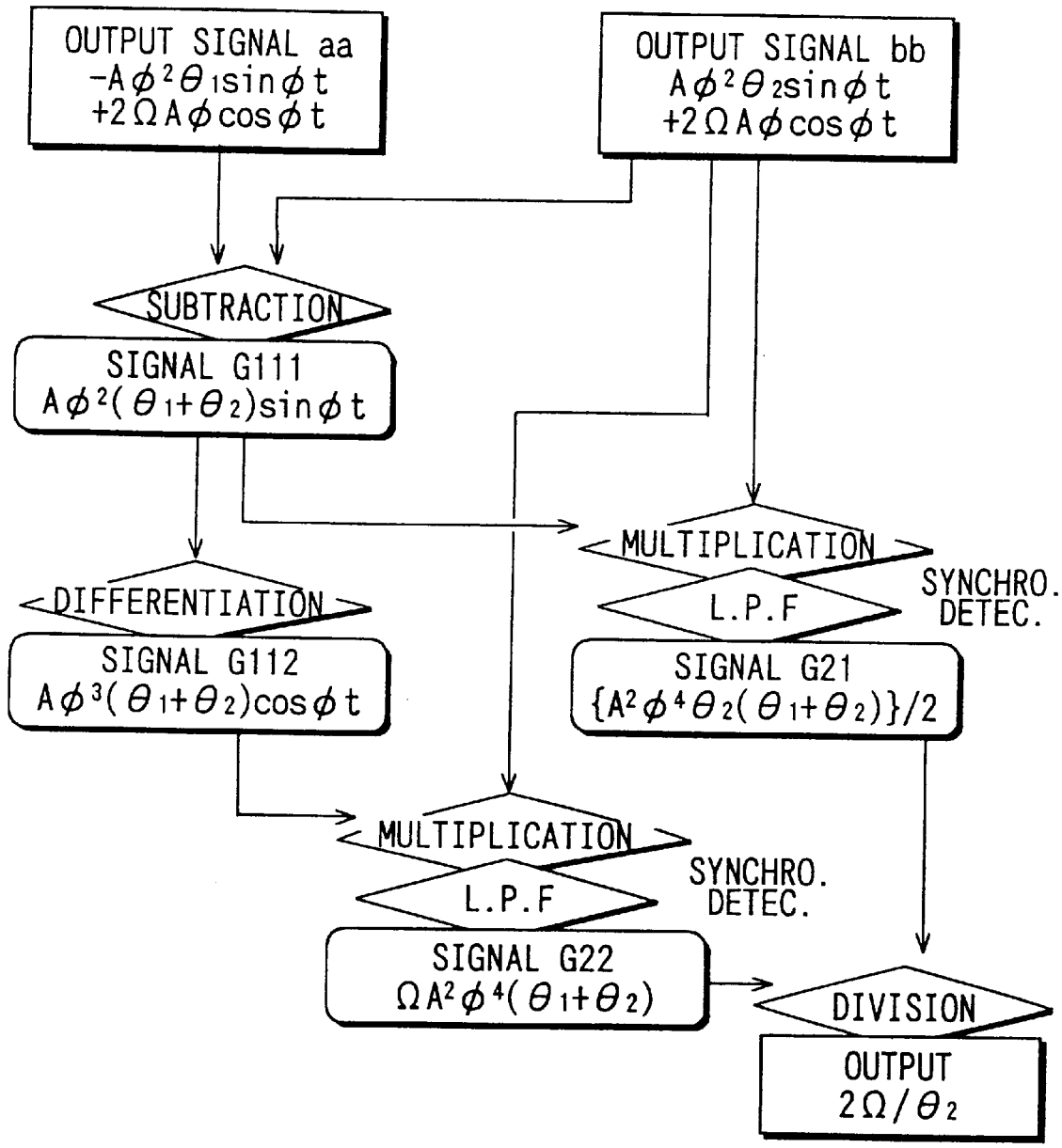
FIG. 19 is an explanatory diagram for explaining another processing method by the circuit portion in the fourteenth embodiment.

In FIG. 18, synchronous detection is performed to the signal G12. However, as shown in FIG. 19, synchronous detection may be performed directly to either one of the signals aa, bb outputted from the acceleration sensing portions 10, 20. In FIGS. 18 and 19, the signal G22 may be used as an output without performing the division of the signals G21 and G22. In this case, although the output may change with respect to the change in driving amplitude, the output does not change with respect to the change in phase of the signal caused by the Coriolis force.

Figure 20:
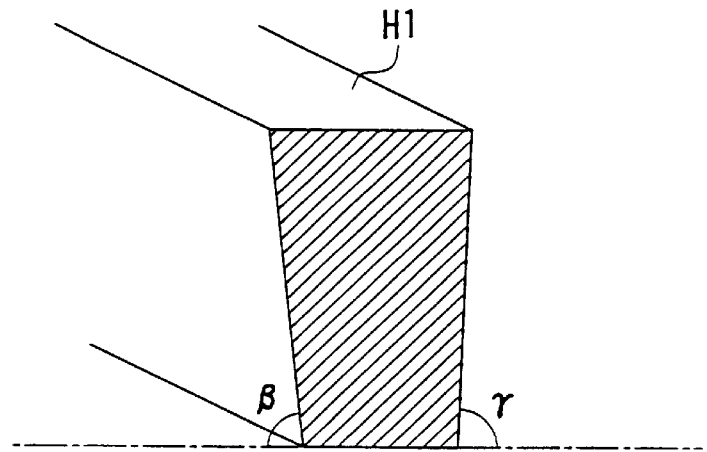
FIG. 20 is a cross-sectional perspective view schematically showing a beam having a processing error.
Figure 23:
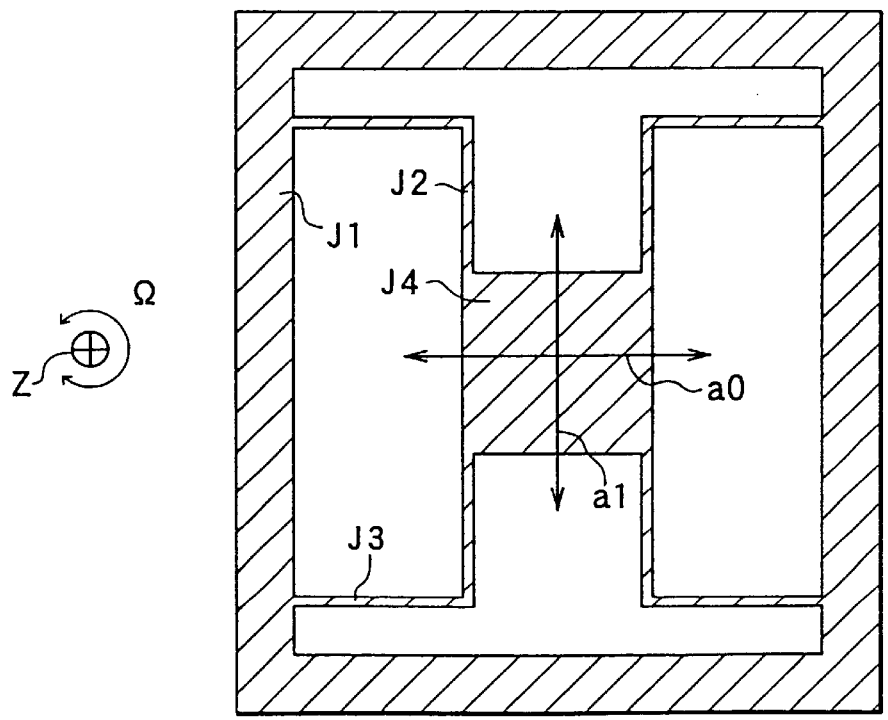
FIG. 23 is a plan view showing a sensor element according to a prior art.

The present embodiment can also be applied to a sensor element, which is manufactured to target the angle θ=0 shown in FIG. 1, but does not have the angle θ=0 due to a processing error, ununiformity of material and the like. For example, as shown in FIG. 20, when a beam H1 is formed by etching, the beam H1 may have tapered corners β, γ in cross-section. Accordingly, the oscillation direction may be deviated from its target. The present embodiment is applicable to such a case.

Figure 21:
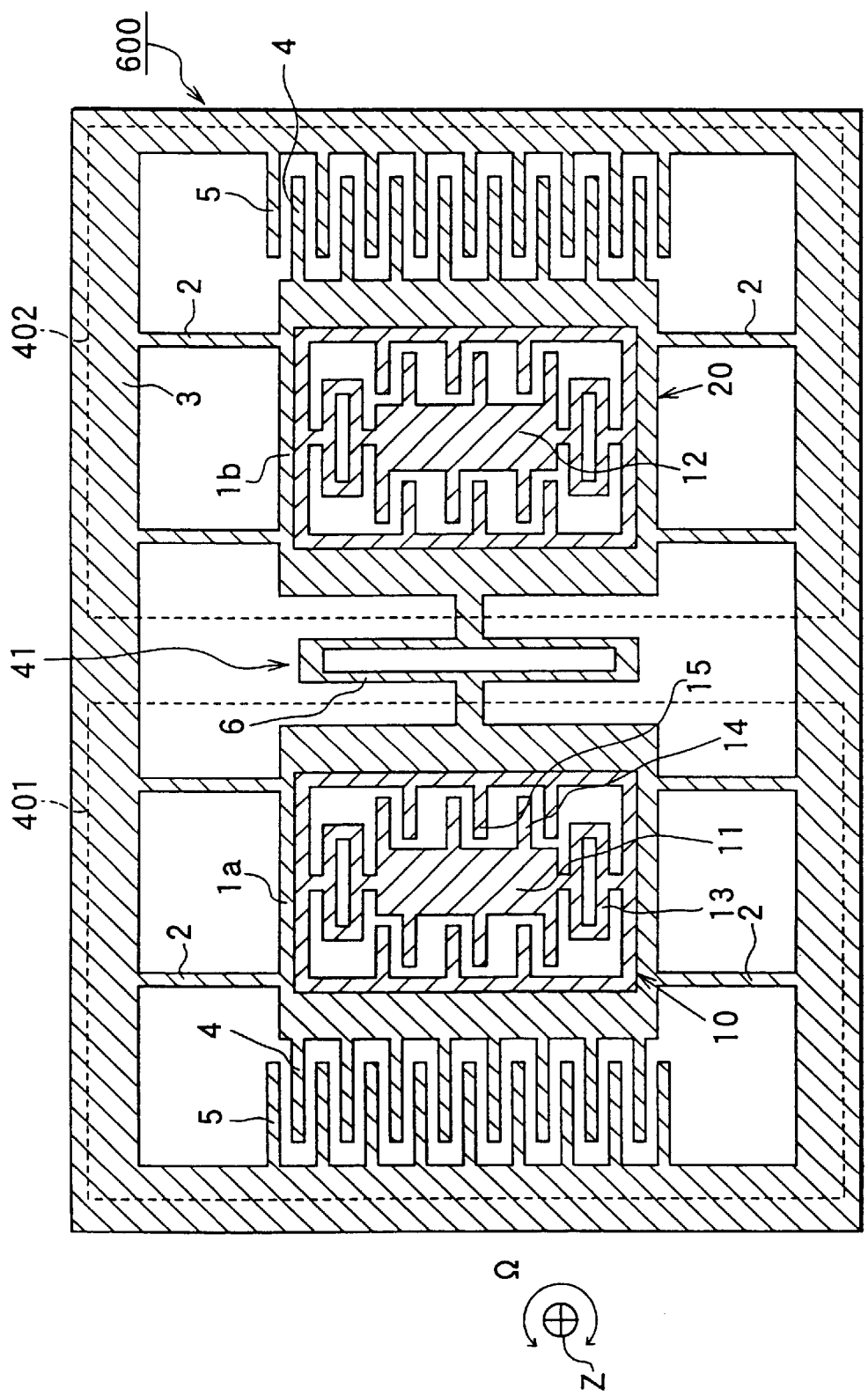
FIG. 21 is a plan view showing a sensor element utilizing a processing error in a modified embodiment of the present invention.

FIG. 21 shows a sensor element 600, in which, referring to FIG. 6, angles between the detecting oscillation directions a1, a2 and the direction K in which the Coriolis force acts are not zero but very close to zero, though the directions a1, a2, K are not shown in FIG. 21. The sensor element 600 has an angle θ1 between the detecting oscillation direction of the first detecting oscillator 11 and the direction K and an angle θ2 between the detecting oscillation direction of the second detecting oscillator 12 and the direction K. The angles θ1, θ2 are not zero, but close to zero. Processing errors of beams and the like cause the deviations of the angles θ1, θ2 from zero.

Even in the sensor element 600, an output of 4Ω/(θ2−θ1) can be obtained with high accuracy and high reliability by processing signals from the sensor element in the manner shown in FIG. 18. The present embodiment is applicable to any one of the embodiments described above when the detecting oscillation direction is deviated from its target duet of a processing error and the like.

Other Embodiments

In the embodiments described above, the number of the detecting oscillators is two. However, the number of the detecting oscillators may be more than two, provided that each detecting oscillation direction of each oscillator makes an angle other than 90° with the drive oscillation direction.

The number of the detecting oscillators may be one. For example, the sensor element 100 shown in FIG. 1 may have only the acceleration sensing portion 10 to output only the output signal aa. In this case, the output signal aa can be divided into a signal caused by the Coriolis force and a signal caused by the inertia force (not caused by the Coriolis force) by performing synchronous detection using, as references, a drive signal sin φt and a signal cons φt obtained by differentiating the drive signal sin φt. Then, an output not depending on the driving amplitude A can be obtained by performing division of the two divided signals.

Accordingly, even when the sensor element has only one detecting oscillator, sensor characteristics do not vary in accordance with the change in ambient temperature and the elapsed time, and the output can be obtained with high accuracy and high reliability. Because additional correction circuits, oscillation monitors and the like are not required, low cost and size reduction of the sensor element can be realized.

In every embodiment described above, the drive oscillation can be performed by various driving methods such as an electromagnetic driving method utilizing a Lorentz's force, a piezoelectric driving method utilizing a piezoelectric effect, and the like in addition to the electrostatic driving method specifically described above. Further, the angular velocity and the like can be detected by various detection methods such as an electromagnetic detection method utilizing electromagnetic induction and a piezoelectric detection method utilizing a piezoelectric effect, in addition to the electrostatic detection method utilizing an electrostatic capacitance. A piezoelectric element, and a strain gauge are also usable to the sensor element.

In every embodiment described above, the several detecting oscillation directions of the several detecting oscillators need not form an approximately identical angle θ with the direction in which the Coriolis force acts. Further, in every embodiment described above, the detection accuracy can be increased by eliminating an externally applied acceleration. For example, FIG. 22 shows a sensor element composed of two sensor elements 100a, 100b, each of which has substantially the same structure as the sensor element 100 shown in FIG. 1.

Figure 22:
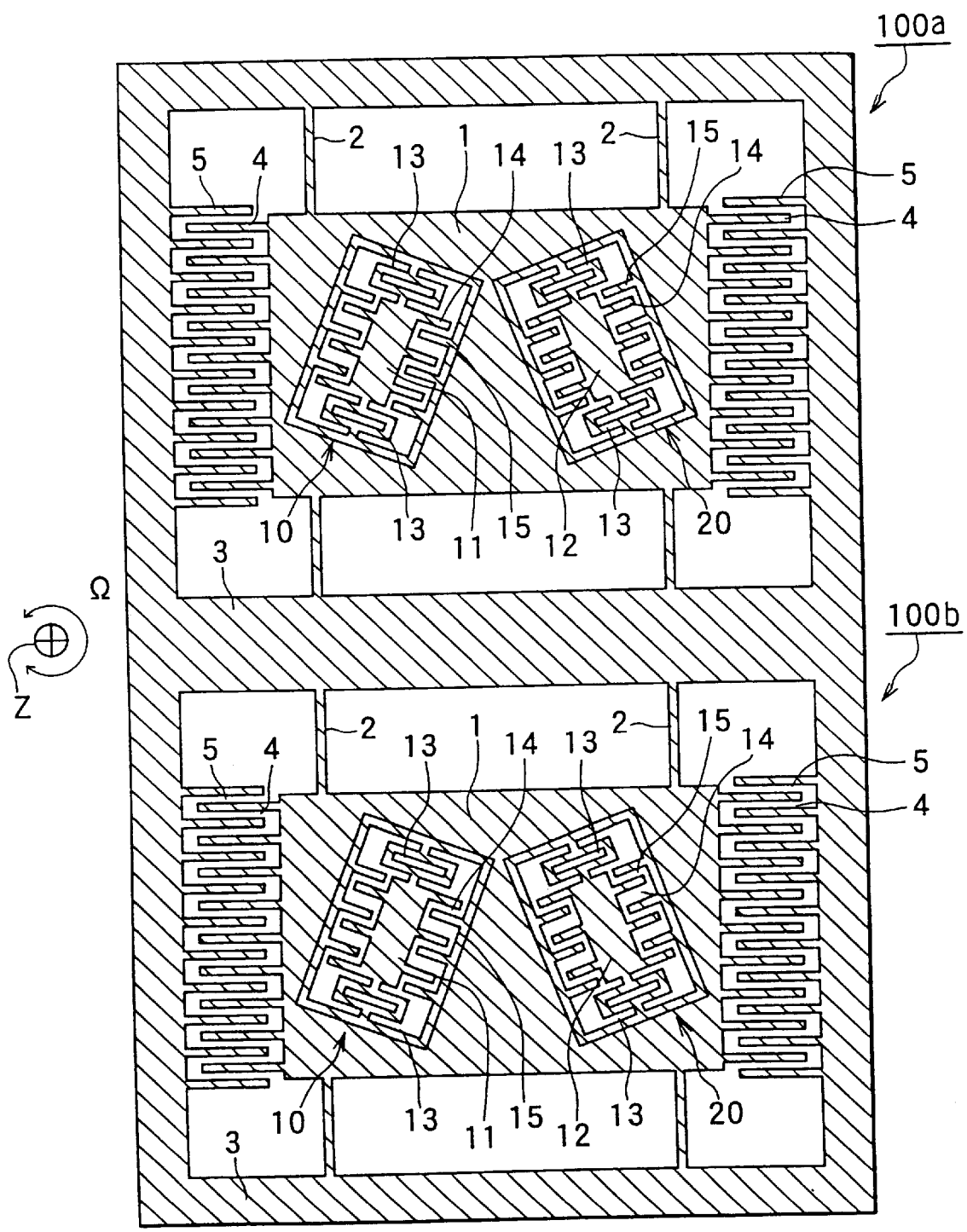
FIG. 22 is a plan view showing an example in which two sensor elements are arranged in another modified embodiment of the present invention.

In FIG. 22, the sensor elements 100a, 100b are oscillated by driving in an antiphase with respect to each other. Accordingly, signals having an antiphase with respect to each other are outputted from the sensor elements 100a, 100b based on the Coriolis forces, which are generated simultaneously in opposite directions with the same magnitude. At the same time, the elements 100a, 100b respectively receive accelerations externally applied thereto with approximately the same magnitude in the same direction.

After that, the output signals from the sensor elements 100a, 100b are operated in the circuit portion 200 as shown in FIG. 4, thereby determining two outputs. When subtraction is performed to the two outputs, the signals caused by the Coriolis forces are added to each other and the signals caused by the accelerations are canceled. As a result, the effects of the externally applied accelerations can be eliminated. At the same time, the sensitivity becomes twice. In FIG. 22, the sensor elements 100a, 100b are arranged longitudinally. However, the sensor elements 100a, 100b may be arranged laterally. The structures of the sensor elements can be selected from those disclosed in any one of the embodiments described above.

In the embodiments described above, the signal caused by the inertia force is considered as the signal not caused by the Coriolis force. However, other signals such as the output from the electrodes 4', 5' for monitoring the drive oscillation, the detected value of the angle deviated from the drive oscillation, and the like can be considered as the signal not caused by the Coriolis force.

While the present invention has been shown and described with reference to the foregoing preferred embodiment, it will be apparent to those skilled in the art that changes in form and detail may be made therein without departing from the scope of the invention as defined in the appended claims.

What is claimed is:

1. An angular velocity sensor device comprising:
   a sensor element including a movable portion which is oscillated by driving on a specific plane, and receives a Coriolis force generated in a specific direction parallel to the specific plane when an angular velocity is generated around an angular velocity axis perpendicular to the specific plane, the sensor element being for outputting at least one output signal in accordance with the Coriolis force; and
   a circuit portion electrically connected to the sensor element to receive the output signal from the sensor element, the circuit portion being for determining the angular velocity by a first signal caused by the Coriolis force and a second signal not caused by the Coriolis force, based on the output signal, the second signal being used as a reference.

2. The angular velocity sensor device of claim 1, wherein:
   the output signal is compound from the first signal and the second signal; and
   the circuit portion divides the output signal into the first signal and the second signal.

3. The angular velocity sensor device of claim 1, wherein a phase of the first signal is shifted at 90° from a phase of the second signal.

4. The angular velocity sensor device of claim 1, wherein:
   the movable portion is oscillated by driving in a first direction, and is oscillated by the Coriolis force in a second direction, the second direction defining an angle other than 90° with the first direction; and
   the second signal is caused by an inertia force applied to the movable portion in the first direction.

5. The angular velocity sensor device of claim 1, wherein the circuit portion calculates an intensity ratio between the first signal and the second signal to determine the angular velocity.

6. The angular velocity sensor device of claim 1, wherein:
   the sensor element outputs first and second output signals; and
   the circuit portion obtains the second signal by performing subtraction or addition of the first and second output signals.

7. The angular velocity sensor device of claim 1, wherein the second signal is caused by an inertia force applied to the movable portion.

8. The angular velocity sensor device of claim 1, wherein the movable portion includes:
   an oscillator for being oscillated by driving in a drive direction and for being oscillated by the Coriolis force in a detecting direction non-parallel to the specific direction in which the Coriolis force is generated; and
   a detecting portion for outputting the output signal to detect the Coriolis force applied to the oscillator.

9. The angular velocity sensor device of claim 1, wherein the movable portion includes:
   a plurality of oscillators which is oscillated by driving with an approximately equal driving magnitude and is oscillated by the Coriolis force in a detecting direction non-parallel to the specific direction in which the Coriolis force is generated; and
   a plurality of detecting portions each provided for a corresponding one of the plurality of oscillators.

10. The angular velocity sensor device of claim 1, wherein the movable portion includes:
    a first oscillator which is oscillated by driving on the specific plane;

second and third oscillators which are oscillated by the Coriolis force in first and second detecting directions when the angular velocity is generated around the angular velocity axis, the first and second detecting directions respectively defining first and second angles larger than zero with the specific direction in which the Coriolis force is generated;

first and second beams connecting the first oscillator to the second oscillator and to the third oscillator; and a detection portion for detecting the Coriolis force applied to the second and third oscillators.

11. The angular velocity sensor device of claim 10, wherein the first and second angles are different from each other.

12. The angular velocity sensor device of claim 10, further comprising:

a fixed portion to which the first oscillator is connected to be oscillated by driving in a drive direction; and third and fourth beams connecting the first oscillator to the fixed portion at both sides of the first oscillator to oscillate the first oscillator by an elastic force thereof, the third and fourth beams being nonsymmetrical to each other.

13. The angular velocity sensor device of claim 10, wherein the first and second angles are defined by a processing error produced when the sensor device is manufactured.

14. The angular velocity sensor device of claim 10, wherein the first, second and third oscillators, and the detecting portion are oscillated by driving together.

15. The angular velocity sensor device of claim 10, wherein:

the first oscillator is oscillated by driving in a drive direction with a first resonance frequency; and the second oscillator is oscillated by the Coriolis force in the detecting direction with a second resonance frequency approximately equal to the first resonance frequency.

16. The angular velocity sensor device of claim 1, further comprising;

a fixed portion to which the movable portion is connected to be oscillated by driving in a drive direction;

first and second beams connecting the movable portion to the fixed portion at both sides of the movable portion to oscillate the movable portion by an elastic force thereof, the first and second beams being nonsymmetrical to each other.

17. The angular velocity sensor device of claim 1, wherein the movable portion includes:

first and second drive oscillators which are oscillated by driving in first and second drive directions on the specific plane perpendicular to the angular velocity axis;

first and second detecting oscillators respectively connected to the first and second drive oscillators to be oscillated by the Coriolis force respectively in first and second detecting directions when the angular velocity is generated, the first and second detecting directions defining first and second angles with the specific direction in which the Coriolis force is generated, the first and second angles being larger than zero; and first and second detecting portions respectively provided for the first and second detecting oscillators to detect the Coriolis force applied to the first and second detecting oscillators.

18. The angular velocity sensor device of claim 17, wherein the first and second detecting oscillators are respectively disposed inside the first and second drive oscillators, and are respectively connected to the first and second drive oscillators via first and second beams.

19. The angular velocity sensor device of claim 17, wherein the first and second drive oscillators are connected to each other via a beam.

20. The angular velocity sensor device of claim 17, wherein the first and second detecting oscillators are respectively disposed outside the first and second drive oscillators, and are respectively connected to the first and second drive oscillators via first and second beams.

21. The angular velocity sensor device of claim 17, wherein the first and second drive oscillators are independent of each other.

22. The angular velocity sensor device of claim 17, wherein the first and second angles are different from each other.

23. The angular velocity sensor device of claim 17, further comprising means for controlling driving amplitudes of the first and second drive oscillators to be approximately equal to each other.

24. The angular velocity sensor device of claim 17, further comprising monitoring means for monitoring first and second physical quantities of drive oscillations of the first and second drive oscillators.

25. The angular velocity sensor device of claim 17, further comprising means for controlling amplitudes of first and second output signals to be approximately equal to each other, the first and second output signals being outputted from the first and second detecting portions, respectively, in accordance with the Coriolis force.

26. The angular velocity sensor device of claim 25, further comprising control means for controlling driving amplitudes of the first and second drive oscillators constant based on the physical quantity monitored by the monitoring means.

27. The angular velocity sensor of claim 17, wherein the Coriolis force is applied to the first and second detecting oscillators directly to oscillate the first and second detecting oscillators.

28. The angular velocity sensor of claim 17, wherein the Coriolis force is applied to the first and second drive oscillators and is transmitted to the first and second detecting oscillators to oscillate the first and second detecting oscillators.

29. The angular velocity sensor of claim 1, wherein the circuit portion has means for extracting the first signal from the output signal by using the second signal.

30. An angular velocity sensor device comprising:

first and second detecting oscillators for detecting an angular velocity generated around an angular velocity axis, the first and second detecting oscillators being oscillated in first and second detecting directions, respectively, by a Coriolis force to output first and second output signals in accordance with the Coriolis force when the angular velocity is generated, the first and second detecting directions being non-parallel to a specific direction in which the Coriolis force is generated;

first signal calculating means for calculating a first signal, which is caused by the Coriolis force, from the first and second output signals;

second signal calculating means for calculating a second signal, which is not caused by the Coriolis force, from the first and second output signals; and angular velocity calculating means for calculating the angular velocity based on the first and second signals calculated by the first signal calculating means and the second signal calculating means.

31. The angular velocity sensor device of claim 30, wherein the second signal is caused by an inertia force applied to the first and second detecting oscillators.

32. The angular velocity sensor device of claim 31, wherein:

the first signal is obtained by performing addition of the first and second output signals; and the second signal is obtained by performing subtraction of the first and second signals.

33. An angular velocity sensor device comprising:

a first sensor element disposed on a first chip to output a first output signal in accordance with an angular velocity generated around an angular velocity axis;

a second sensor element disposed on a second chip to output a second output signal in accordance with the angular velocity, the second chip being independent of the first chip; and means for calculating a first signal caused by a Coriolis force generated by the angular velocity and a second signal not caused by the Coriolis force, based on the first and second output signals, and for calculating the angular velocity based on the first and second signals.

34. The angular velocity sensor device of claim 33, wherein the second signal is caused by an inertia force.

* * * * *